United States Patent [19]
Kurachi et al.

[11] Patent Number: 5,996,363
[45] Date of Patent: Dec. 7, 1999

[54] OIL LEVEL EQUALIZING SYSTEM FOR PLURAL COMPRESSORS

[75] Inventors: Masao Kurachi, Ikoma-gun; Takashi Kaneko, Yamatotakada; Michiyoshi Kusaka, Osaka; Kazuo Nakatani, Kadoma, all of Japan

[73] Assignee: Masushita Refrigeration Company, Higashiosaka, Japan

[21] Appl. No.: 08/905,729

[22] Filed: Aug. 4, 1997

[30] Foreign Application Priority Data

Oct. 28, 1996 [JP] Japan .................................. 8-284862
Nov. 22, 1996 [JP] Japan .................................. 8-311631

[51] Int. Cl.$^6$ .................................................. F25B 31/00
[52] U.S. Cl. ........................... 62/192; 62/469; 62/510; 417/372
[58] Field of Search ........................ 62/192–193, 196.1, 62/196.2, 468–471, 503, 510; 417/372, 902

[56] References Cited

U.S. PATENT DOCUMENTS

| | | |
|---|---|---|
| 4,478,050 | 10/1984 | DiCarlo et al. . |
| 4,621,505 | 11/1986 | Ares et al. ............................. 62/510 X |
| 4,672,822 | 6/1987 | Iijima et al. ............................... 62/468 |
| 5,321,956 | 6/1994 | Kemp et al. ............................ 62/468 X |
| 5,327,997 | 7/1994 | Nash, Jr. et al. . |

FOREIGN PATENT DOCUMENTS

| | | |
|---|---|---|
| 4-19675 | 2/1992 | Japan . |
| 2 165 931 | 4/1986 | United Kingdom . |
| 90/00710 | 1/1990 | WIPO . |
| 95/12649 | 5/1995 | WIPO . |
| 95/35462 | 12/1995 | WIPO . |
| 96/21802 | 7/1996 | WIPO . |

*Primary Examiner*—Henry Bennett
*Assistant Examiner*—Susanne C. Tinker
*Attorney, Agent, or Firm*—Wenderoth, Lind & Ponack, L.L.P.

[57] ABSTRACT

An air conditioning equipment is provided with an oil level equalizing system, which includes a plurality of low-pressure shell-type compressors communicating with a suction line through a plurality of branch portions, a plurality of connecting lines each communicating with a corresponding compressor shell at a location adjacent to a normal oil level in the shell, and an oil level equalizing line communicating with the plurality of connecting lines. The oil level equalizing system also includes a communication line, through which the suction line communicates with the oil level equalizing line at a location upstream of the plurality of branch portions with respect to a direction of flow of a refrigerant. This arrangement functions to increase the pressure within the oil level equalizing line to a value higher than that within the shell of each compressor. A gas/liquid separator for separating a gas refrigerant and a liquid refrigerant or an oil/gas separator for separating oil from the gas refrigerant may be provided in the suction line upstream of the plurality of branch portions. Alternatively, an accumulator may be provided.

16 Claims, 16 Drawing Sheets

OIL LEVEL EQUALIZING SYSTEM FOR PLURAL COMPRESSORS

BACKGROUND OF THE INVENTION

1. Field of the Invention

The present invention relates to an oil level equalizing system for a plurality of low-pressure shell-type compressors arranged in parallel.

2. Description of Related Art

Japanese Laid-Open Utility Model Publication (unexamined) No. 4-19675 discloses an oil level equalizing system for a plurality of low-pressure shell-type compressors arranged in parallel.

This oil level equalizing system will be explained hereinafter with reference to the attached drawings. FIG. 19 depicts a refrigerating cycle of an air-conditioning equipment employing the conventional oil level equalizing system for the plurality of compressors. FIG. 20 is a detailed view of a portion denoted by A in FIG. 19.

In FIGS. 19 and 20, an outdoor unit 1 of the air-conditioning equipment comprises a plurality of low-pressure shell-type compressors 2a, 2b, 2c, a four-way valve 3 for switching the flowing direction of a refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. An indoor unit 6a, 6b or 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected with the indoor units 6a, 6b, 6c thereby constituting a looped refrigerant circuit.

Reference numeral 9 designates a suction line which communicates with the suction side of the compressors 2a, 2b, 2c, and reference numerals 10a and 10b designate branch portions of the suction line 9.

The compressors 2a, 2b, 2c are connected at respective positions adjacent to the normal oil level within the shell with an oil level equalizing line 11 via connecting lines 12a, 12b, 12c.

An oil level controlling method for each compressor in the air conditioning equipment of the above-described construction will be explained hereinafter.

When the oil level rises due to an increase in the oil quantity within the shell of any one of the compressors 2a, 2b, 2c, the pressure at the connecting portion of the corresponding connecting line 12a, 12b or 12c increases. In contrast, when the oil level lowers due to a reduction in the oil quantity within the shell of any one of the compressors 2a, 2b, 2c, the pressure at the connecting portion of the corresponding connecting line 12a, 12b or 12c decreases.

Accordingly, for example, when the oil quantity within the compressor 2a decreases due to oil foaming or the like at the time of starting, the oil level within the compressor 2a lowers, so that the pressure at the connecting portion of the connecting line 12a of the compressor 2a lowers below the pressures at the connecting portions of the connecting lines 12b, 12c of the compressors 2b, 2c. Therefore, the oils within the shells of the compressors 2b, 2c transfer into the shell of the compressor 2a through an oil level equalizing line 11 to prevent shortage of the oil quantity within the compressor 2a. In this way, when the respective compressors 2a, 2b, 2c have the same capacities and the pressures within their respective shells are the same, it becomes possible to adequately control the oil quantities within the respective compressors 2a, 2b, 2c.

However, when one or more compressors having different capacities or variable capacities are included among the plurality of compressors 2a, 2b, 2c, since the respective compressors 2a, 2b, 2c are of the low-pressure shell-type, the pressures within the shells of the compressors of the high capacity type lower and the pressures within the shells of the compressors of the low capacity type rise.

Accordingly, for example, when the compressor 2a has a smaller capacity than those of the compressors 2b, 2c, the pressure within the shell of the compressor 2a becomes higher than those within the shells of the compressors 2b, 2c, and the pressure at the connecting portion of the connecting line 12a of the compressor 2a becomes higher than those at the connecting portions of the connecting lines 12b, 12c of the compressors 2b, 2c, so that the oil within the shell of the compressor 2a transfers into the shells of the compressors 2b, 2c through the oil level equalizing line 11 to decrease the oil quantity of the compressor 2a.

At this moment, the oil stirred by rotary elements or the oil dropping from the compressor drifts in mist state within the shell of the compressor 2a, and the oil in the mist state also transfers into the compressors 2b, 2c together with the refrigerant.

Accordingly, even when the oil level within the compressor 2a lowers below a connecting position of the connecting line 12a, the oil quantity continues to decrease and becomes short before long to consequently damage the compressor 2a.

In this way, when the plurality of compressors having different capacities are used, there arises the problem that the oil quantity within the low capacity compressor becomes insufficient.

In order to solve that problem, it may be proposed that all the compressors are stopped and supplied with the oil for equalizing the oil levels at predetermined time intervals. In this case, however, since the time may be usually set to several minutes to several tens of minutes, the operation is frequently turned ON and OFF to make the system unstable, resulting in a reduction in efficiency and reliability of the system.

SUMMARY OF THE INVENTION

The present invention has been developed to overcome the above-described disadvantages.

It is accordingly an objective of the present invention to provide an oil level equalizing system for a compression system having a plurality of low-pressure shell-type compressors arranged in parallel, which oil level equalizing system is capable of reliably securing the necessary quantity of oil within a shell of each compressor. According to the present invention, even when compressors having whatever different capacities are arranged or used in any combination, a suction line disposed on the upstream side of a suction line branch portion to each compressor is communicated with an oil level equalizing line via a communication line to increase the pressure within the oil level equalizing line higher than the pressure within the shell of each compressor.

Another objective of the present invention is to provide the oil level equalizing system of the above-described type which is simple in construction and can be made at a low cost.

In accomplishing the above and other objectives, the oil level equalizing system according to the present invention comprises: a suction line having a plurality of branch portions branched therefrom; a plurality of compressors each communicating with one of the plurality of branch portions and each having a low-pressure shell; a plurality of connecting lines each having a first end communicating with the shell at a location adjacent to a normal oil level therein; an oil level equalizing line communicating with second ends of the plurality of connecting lines, and a communication. The suction line communicates with the oil level equalizing line through the communication line at a location upstream of the plurality of branch portions with respect to a direction of flow of a refrigerant, for increasing a pressure within the oil level equalizing line to a value higher than that within the shell of each of the plurality of compressors.

A gas/liquid separator may be provided in the suction line for separating a gas refrigerant and a liquid refrigerant. The gas/liquid separator has an upper portion in which the gas refrigerant is accommodated and which communicates with the oil level equalizing line through the communication line.

Alternatively, an oil/gas separator may be provided in the suction line for separating oil from a gas refrigerant and an accumulator arranged in the suction line upstream of the oil/gas separator with respect to the direction of flow of the refrigerant. The oil/gas separator has a portion in which the gas refrigerant is accommodated and which communicates with the oil level equalizing line through the communication line.

Again alternatively, only an accumulator may be provided in the suction line. In this case, the accumulator has an upper portion in which the gas refrigerant is accommodated and which communicates with the oil level equalizing line through the communication line.

The oil level equalizing system may further comprise a two-way valve arranged in a midway portion of the communication line for increasing, when opened, a pressure within the oil level equalizing line to a specific value, and a two-way valve control means for closing the two-way valve for a predetermined period of time when a continuous running time for cooling or heating reaches a predetermined time.

Alternatively, the oil level equalizing system comprises a two-way valve arranged in a midway portion of the communication line for increasing, when opened, a pressure within the oil level equalizing line to a specific value, a plurality of pressure differential detecting units each for detecting a pressure differential between a shell upper portion and a shell lower portion of a corresponding one of the plurality of compressors, and a two-way valve control means for closing the two-way valve when the pressure differential detected by at least one of the plurality of pressure differential detecting units becomes smaller than a predetermined lower limit, and for subsequently opening the two-way valve when the pressure differentials detected by all the pressure differential detecting units become equal to or larger than a predetermined reference pressure differential.

Again alternatively, the oil level equalizing system comprises a two-way valve arranged in a midway portion of the communication line for increasing, when opened, a pressure within the oil level equalizing line to a specific value, a plurality of oil level detecting units each for detecting an oil level in a corresponding one of the plurality of compressors, and a two-way valve control means for closing the two-way valve when the oil level detected by at least one of the plurality of oil level detecting units becomes lower than a predetermined lower limit, and for subsequently opening the two-way valve when the oil levels detected by all the oil level detecting units become equal to or higher than a predetermined reference oil level.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on applications Nos. 8-284862 and 8-311631 filed in Japan, the content of which is incorporated hereinto by reference.

The term "low-pressure shell-type compressor" as employed throughout this application is defined as a compressor having a low-pressure shell.

An oil level equalizing system for plural compressors according to a first embodiment of the present invention will be explained hereinafter with reference to the drawings.

Figure 1:
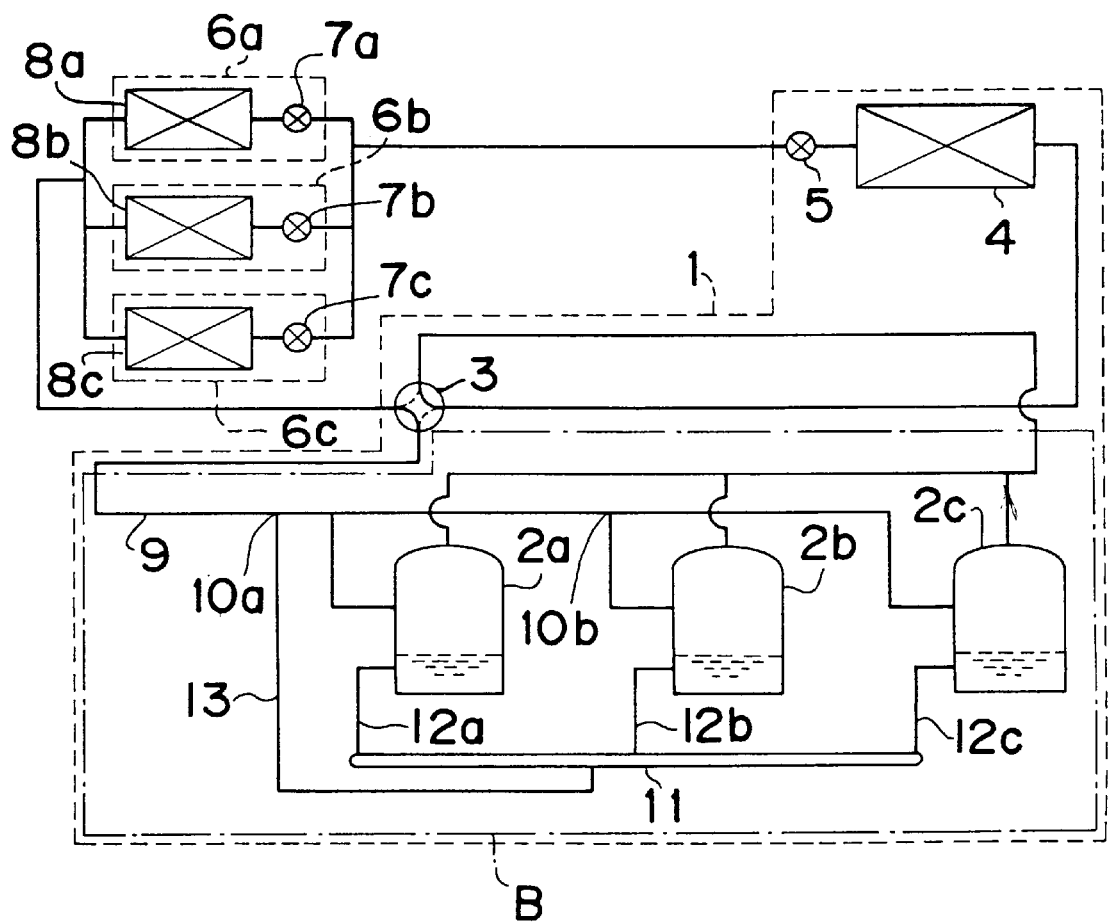
FIG. 1 is a diagram of a refrigerating cycle of an air conditioning equipment employing an oil level equalizing system for plural compressors according to a first embodiment of the present invention.
Figure 2:
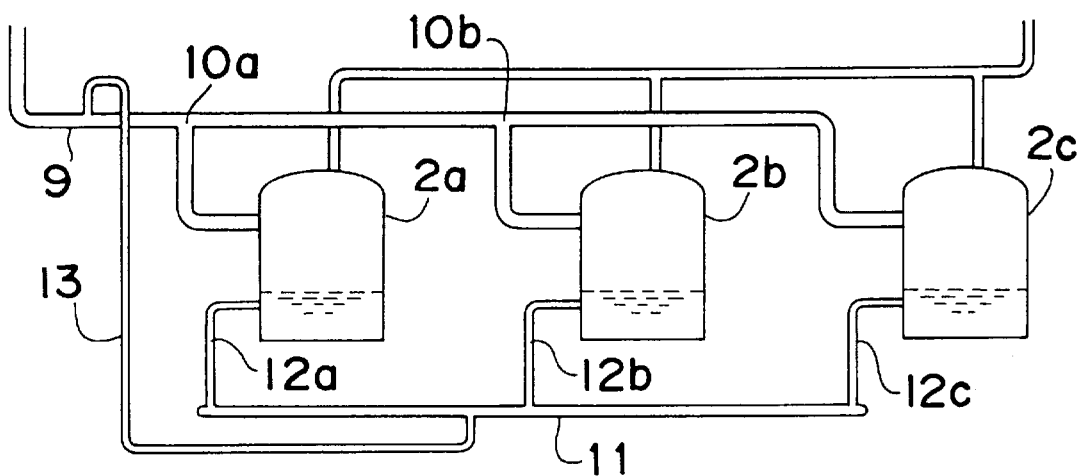
FIG. 2 is a detailed view of a portion denoted by B in FIG. 1.

FIG. 1 is a diagram of a refrigerating cycle of an air conditioning equipment or apparatus employing the oil level equalizing system according to the first embodiment of the present invention, and FIG. 2 is a detailed view of a portion denoted by B in FIG. 1.

In FIGS. 1 and 2, an outdoor unit 1 of an air conditioning equipment or apparatus comprises a plurality of low-pressure shell-type compressors 2a, 2b, 2c, a four-way valve 3 for switching the flowing direction of a refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the section side of the compressors 2a, 2b, 2c, and reference numerals 10a, 10b designate branch portions branched from the suction line 9 and communicating with the compressors 2a, 2b, 2c.

The compressors 2a, 2b, 2c are connected at respective positions adjacent to the normal oil level within the shell with an oil level equalizing line 11 via oil level equalizing line connecting lines 12a, 12b, 12c (these lines are often referred to simply as the connecting lines hereinafter). Reference numeral 13 designates a communication line for communicating the suction line 9 with the oil level equalizing line 11 at a location upstream of the suction line branch portions 10a, 10b for the compressor 2a, 2b, 2c with respect to the direction of flow of a refrigerant.

The oil level equalizing system according to the first embodiment of the present invention comprises the plurality of low-pressure shell-type compressors 2a, 2b, 2c, the connecting lines 12a, 12b, 12c for connecting the oil level equalizing line 11 with the compressors 2a, 2b, 2c at locations adjacent to the normal oil levels within respective shells, and the communication line 13 for communicating the oil level equalizing line 11 with the suction line 9 on the upstream side of the suction line branch portions 20a, 10b for the respective compressors 2a, 2b, 2c to increase the pressure within the oil level equalizing line 11 higher than the pressures within the shells of the respective compressors 2a, 2b, 2c.

A method of adequately regulating the oil quantity within each compressor 2a, 2b 2c in the oil level equalizing system of the above-described construction will be explained hereinafter.

It is first assumed that the plurality of compressors 2a, 2b, 2c include compressors having different capacities or variable capacities, and that the compressor 2a has a smaller capacity than those of the compressors 2b, 2c.

During the operation of all the compressors 2a, 2b, 2c, the pressure within the oil level equalizing line 11 communicating through the communication line 13 with the suction line 9 becomes higher than those within the shells of the respective compressors 2a, 2b, 2c. Therefore, the oil in the low-capacity compressor 2a is not allowed to flow out therefrom to the connecting line 12a, and oil level differentials do not occur which might be caused by the oil transfer due to internal pressure differentials between the shells of the respective compressors 2a, 2b, 2c.

In the case of such non-oil transfer, the delivery oil quantity and the return oil quantity in the respective compressors 2a, 2b, 2c will be explained hereinafter. When studying the delivery oil quantity, since the oil quantity supplied to a compression chamber of each of the high-capacity compressors 2b, 2c is generally greater than that for the low-capacity compressor 2a, the oil content of the delivered refrigerant of the high-capacity compressors 2b, 2c is higher than that in the low-capacity compressor 2a. On the other hand, when studying the return oil quantity, since the oil contents of the refrigerants in the suction lines 9 to the respective compressors 2a, 2b, 2c are equal to one another, the return oil quantities to the respective compressors 2a, 2b, 2c are in proportion to circulating refrigerant quantities in the respective compressors 2a, 2b, 2c.

Oil contained in the refrigerant flowing through the communication line 13 is returned from the oil level equalizing line 11 to the respective compressors 2a, 2b, 2c through the respective connecting lines 12a, 12b, 12c together with the refrigerant. At this time, the quantity of refrigerant to be distributed is in proportion to a square root of a differential pressure between the oil level equalizing line 11 and the shell of each compressor 2a, 2b, 2c. Similarly, the return oil quantity is in proportion to a square root of the differential pressure between the oil level equalizing line 11 and the shell of each compressor 2a, 2b, 2c.

As mentioned above, since the oil content of the delivered refrigerant in each high-capacity compressor 2b, 2c is high, the quantity of the delivered oil is large. On the other hand, the quantity of the oil returned from the suction line 9 is in proportion to the circulating quantity and the quantity of the oil returned from the oil level equalizing line 11 is in proportion to the square root of the pressure differential between the shells. Accordingly, the quantity of the returned oil is smaller than the quantity of the delivered oil and, hence, when the non-stop operation is continued, for example, for 20 hours, the oil quantity gradually decreases.

However, when all the compressors 2a, 2b, 2c stop for a certain period of time (for example, 5 minutes) at predetermined time intervals (for example, 10 hours), the pressures within the refrigerating cycle are equalized and the oils transfer through the oil level equalizing line 11 so as to equalize the oil levels in the respective compressors 2a, 2b, 2c, thereby regulating the oil quantity.

Even when only one of the compressors 2a, 2b, 2c is operated, the pressure within the oil level equalizing line 11 becomes higher than the pressures within the shells of the respective compressors 2a, 2b, 2c, thereby preventing the oils in the respective compressors 2a, 2b, 2c from moving to the oil level equalizing line 11.

Accordingly, in applications where one or more compressors having different capacities or variable capacities are included among the plurality of compressors 2a, 2b, 2c, even when the pressure differentials between the shells of the respective compressors 2a, 2b, 2c occur, no oil transfers from the low-capacity compressor 2a to the high-capacity compressors 2b, 2c through the oil level equalizing line 11. Accordingly, it becomes possible to prevent shortage of the oil quantity within the low-capacity compressor 2a for a long period of time and to continue the non-stop operation for a long time.

Further, when all the compressors 2a, 2b, 2c stop for a predetermined period of time at predetermined time intervals, the pressures within the refrigerating cycle are equalized, and the oil transfers through the oil level equalizing line 11 so as to equalize the oil levels in the respective compressors 2a, 2b, 2c, thereby regulating the oil quantity and maintaining the adequate oil levels in the respective compressors 2a, 2b, 2c.

An oil level equalizing system for plural compressors according to a second embodiment of the present invention will be explained hereinafter.

Figure 3:
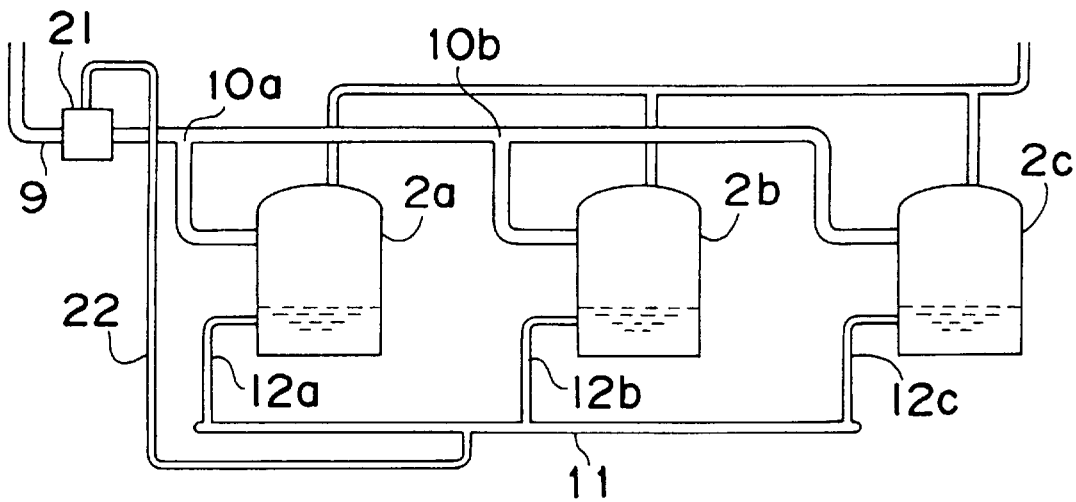
FIG. 3 is a view similar to FIG. 2, but according to a second embodiment of the present invention.

As shown in FIG. 3, the oil level equalizing system according to this embodiment comprises a plurality of low-pressure shell-type compressors 2a, 2b, 2c, oil level equalizing line connecting lines 12a, 12b, 12c arranged for respective compressors 2a, 2b, 2c and each having one end connected to the shell of the corresponding compressor at a location adjacent to the normal oil level within the shell, an oil level equalizing line 11 connected to the other ends of the respective connecting lines 12a, 12b, 12c, a gas/liquid separator 21 arranged in the suction line 9 on the upstream side of suction line branch portions 10a, 10b for the respective compressors 2a, 2b, 2c so as to separate a gas refrigerant and a liquid refrigerant, and a communication line 22 for communicating an upper gas refrigerant portion of the separator 21 with the oil level equalizing line 11 to increase the pressure within the oil level equalizing line 11 higher than the pressures within the shells of the respective compressors 2a, 2b, 2c.

In the oil level equalizing system of the above-described construction, a method of adequately regulating the oil quantity in each compressor 2a, 2b 2c will be explained hereinafter.

Herein, it is assumed that the plurality of compressors 2a, 2b, 2c include compressors of different capacities or variable capacities, and that the compressor 2a has a smaller capacity than those of the compressors 2b, 2c.

First, during the operation of all the compressors 2a, 2b, 2c, the pressure within the oil level equalizing line 11 communicating through the communication line 22 with the gas/liquid separator 21 becomes higher than those within the shells of the respective compressors 2a, 2b, 2c. Therefore, the oil flowing out from the low-capacity compressor 2a to the connecting line 12a is blocked, so that oil level differentials do not occur which might be caused by the oil transfer due to internal pressure differentials between the shells of the respective compressors 2a, 2b, 2c.

In the case of such non-oil transfer, the delivery oil quantity and the return oil quantity in the respective compressors 2a, 2b, 2c will be explained hereinafter. When studying the delivery oil quantity, since the oil quantity supplied to a compression chamber of each of the high-capacity compressors 2b, 2c is generally greater than that for the low-capacity compressor 2a, the oil content of the delivered refrigerant of the high-capacity compressors 2b, 2c is higher than that in the low-capacity compressor 2a. On the other hand, when studying the return oil quantity, since the oil contents of the refrigerants in the suction lines 9 to the respective compressors 2a, 2b, 2c are equal to one another, the return oil quantities to the respective compressors 2a, 2b, 2c are in proportion to circulating refrigerant quantities in the respective compressors 2a, 2b, 2c.

Some quantity of oil contained in the refrigerant flowing through the communication line 22 is returned from the oil level equalizing line 11 to the respective compressors 2a, 2b, 2c through the respective connecting lines 12a, 12b, 12c together with the refrigerant. At this moment, the quantity of refrigerant to be distributed is in proportion to a square root of a differential pressure between the oil level equalizing line 11 and the shell of each compressor 2a, 2b, 2c. Similarly, the quantity of the return oil is in proportion to a square root of the differential pressure between the oil level equalizing line 11 and the shell of each compressor 2a, 2b, 2c.

As mentioned above, since the oil content of the delivered refrigerant in each high-capacity compressor 2b, 2c is high, the quantity of the delivered oil is large. On the other hand, the quantity of the oil returned from the suction line 9 is in proportion to the circulating quantity and the quantity of the oil returned from the oil level equalizing line 11 is in proportion to the square root of the pressure differential between the shells. Accordingly, the quantity of the returned oil becomes less in comparison with the quantity of the delivered oil and, hence, when the non-stop operation is continued, for example, for 20 hours, the oil quantity gradually decreases.

However, when all the compressors 2a, 2b, 2c stop for a certain period of time (for example, 5 minutes) at predetermined time intervals (for example, 10 hours), the pressures within the refrigerating cycle are equalized and the oils transfer through the oil level equalizing line 11 so as to equalize the oil levels in the respective compressors 2a, 2b, 2c, thereby regulating the oil quantity.

Even when only one of the compressors 2a, 2b, 2c is operated, the pressure within the oil level equalizing line 11 becomes higher than the pressures within the shells of the respective compressors 2a, 2b, 2c, to thereby prevent the oil in the respective compressors 2a, 2b, 2c from transferring to the oil level equalizing line 11.

Accordingly, in applications where one or more compressors of different capacities or variable capacities are included among the plurality of compressors 2a, 2b, 2c, even when the pressure differentials between the shells of the respective compressors 2a, 2b, 2c occur, no oil transfers from the low-capacity compressor 2a to the high-capacity compressors 2b, 2c through the oil level equalizing line 11. As a result, it becomes possible to prevent shortage of the oil quantity within the low-capacity compressor 2a for a long period of time and to continue the non-stop operation for a long time.

Further, when all the compressors 2a, 2b, 2c stop for a certain period of time at predetermined time intervals, the pressures within the refrigerating cycle are equalized, and the oil transfers through the oil level equalizing line 11 to equalize the oil levels in the respective compressors 2a, 2b, 2c, thus regulating the oil quantity and maintaining the adequate oil levels in the respective compressors 2a, 2b, 2c.

In this embodiment, since the gas refrigerant from which the oil has been separated by the gas/liquid separator 21 is introduced into the oil level equalizing line 11, it becomes possible to carry out a longer time non-stop operation in comparison with the first embodiment.

An oil level equalizing system for plural compressors according to a third embodiment of the present invention will be explained hereinafter.

Figure 4:
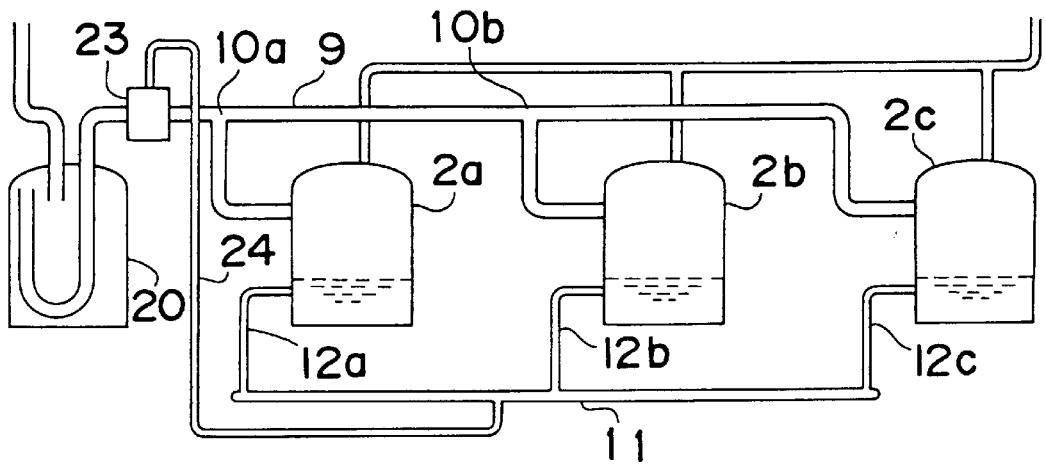
FIG. 4 is a view similar to FIG. 2, but according to a third embodiment of the present invention.

FIG. 4 is a view showing the schematic construction of the oil level equalizing system according to the third embodiment of the present invention.

The oil level equalizing system according to this embodiment comprises a plurality of low-pressure shell-type compressors 2a, 2b, 2c, oil level equalizing line connecting lines 12a, 12b, 12c arranged for respective compressors 2a, 2b, 2c and each having one end connected to the shell of the corresponding compressor at a location adjacent to the normal oil level within the shell, an oil level equalizing line 11 connected to the other ends of the respective connecting lines 12a, 12b, 12c, an oil/gas separator 23 arranged in the suction line 9 on the upstream side of suction line branch portions 10a, 10b for the respective compressors 2a, 2b, 2c so as to separate oil from a gas refrigerant, an accumulator 20 arranged in the suction line 9 on the upstream side of the separator 23, and a communication line 24 for communicating an upper gas refrigerant portion of the separator 23 with the oil level equalizing line 11 to increase the pressure within the oil level equalizing line 11 higher than the pressures within the shells of the respective compressors 2a, 2b, 2c.

In the oil level equalizing system of the above-described construction, a method of adequately regulating the oil quantity in each compressor 2a, 2b 2c will be explained hereinafter.

It is assumed that the plurality of compressors 2a, 2b, 2c include one or more compressors of different or variable capacities, and that the compressor 2a has a smaller capacity than those of the compressors 2b, 2c.

During the operation of all the compressors 2a, 2b, 2c, the pressure within the oil level equalizing line 11 communicating through the communication line 24 with the oil/gas separator 23 becomes higher than those within the shells of the respective compressors 2a, 2b, 2c. Therefore, the oil flowing out from the low-capacity compressor 2a to the connecting line 12a is blocked, so that oil level differentials do not occur which might be caused by the oil transfer due to internal pressure differentials between the shells of the respective compressors 2a, 2b, 2c.

In the case of such non-oil transfer, the delivery oil quantity and the return oil quantity in the respective compressors 2a, 2b, 2c will be explained hereinafter. When studying the delivery oil quantity, since the oil quantity supplied to a compression chamber of each of the high-capacity compressors 2b, 2c is generally greater than that for the low-capacity compressor 2a, the oil content of the delivered refrigerant of the high-capacity compressors 2b, 2c is higher than that in the low-capacity compressor 2a. On the other hand, when studying the return oil quantity, since the oil contents of the refrigerants in the suction lines 9 to the respective compressors 2a, 2b, 2c are equal to one another, the return oil quantities to the respective compressors 2a, 2b, 2c are in proportion to circulating refrigerant quantities in the respective compressors 2a, 2b, 2c.

Incidentally, since no oil is contained in the gas refrigerant flowing through the communication line 24 owing to the function of the oil/gas separator 23, no oil is returned from the oil level equalizing line 11.

As mentioned above, since the oil content of the delivered refrigerant in each high-capacity compressor 2b, 2c is high, the quantity of the delivered oil is large. On the other hand, the quantity of the oil returned from the suction line 9 is in proportion to the circulating quantity. Accordingly, since the quantity of the returned oil becomes less in comparison with the quantity of the delivered oil, when the non-stop operation is continued (for example, 20 hours), the oil quantity gradually decreases.

However, when all the compressors 2a, 2b, 2c stop for a certain period of time (for example, 5 minutes) at predetermined time intervals (for example, 10 hours), the pressures within the refrigerating cycle are equalized, and the oils transfer through the oil level equalizing line 11 so as to equalize the oil levels in the respective compressors 2a, 2b, 2c, thereby regulating the oil quantity.

Even when only one of the compressors 2a, 2b, 2c is operated, the pressure within the oil level equalizing line 11 becomes higher than the pressures within the shells of the respective compressors 2a, 2b, 2c to prevent the oil in the respective compressors 2a, 2b, 2c from transferring to the oil level equalizing line 11.

Accordingly, in applications where one or more compressors having different or variable capacities are included among the plurality of compressors 2a, 2b, 2c, even when the pressure differentials between the shells of the respective compressors 2a, 2b, 2c occur, no oil transfers from the low-capacity compressor 2a to the high-capacity compressors 2b, 2c through the oil level equalizing line 11. As a result, it becomes possible to prevent shortage of the oil quantity within the low-capacity compressor 2a for a long period of time and to continue the non-stop operation for a long time.

Further, when all the compressors 2a, 2b, 2c stop for a certain period of time at predetermined time intervals, the pressures within the refrigerating cycle are equalized, and the oil transfers through the oil level equalizing line 11 to equalize the oil levels in the respective compressors 2a, 2b, 2c, thus regulating the oil quantity and maintaining the adequate oil levels in the compressors 2a, 2b, 2c.

In this embodiment, since the gas refrigerant from which the oil has been separated by the oil/gas separator 23 is introduced into the oil level equalizing line 11, it becomes possible to carry out a longer time non-stop operation in comparison with the first and second embodiments.

An oil level equalizing system for plural compressors according to a fourth embodiment of the present invention will be explained hereinafter.

Figure 5:
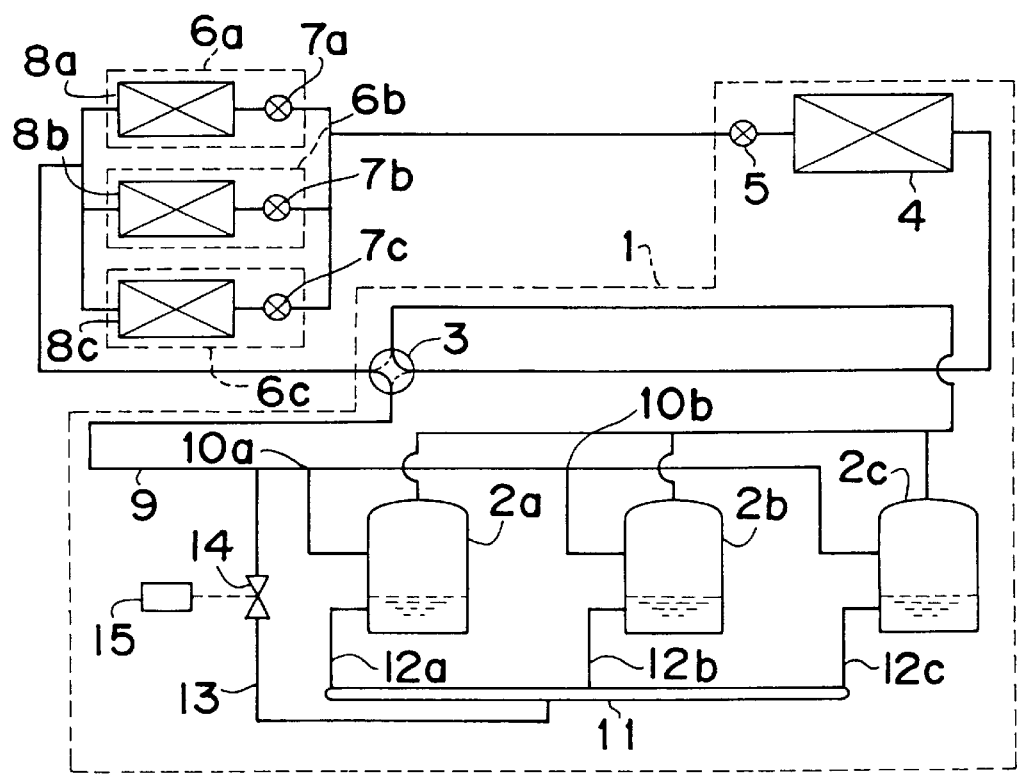
FIG. 5 is a diagram similar to FIG. 1, but according to a fourth embodiment of the present invention.
Figure 6:
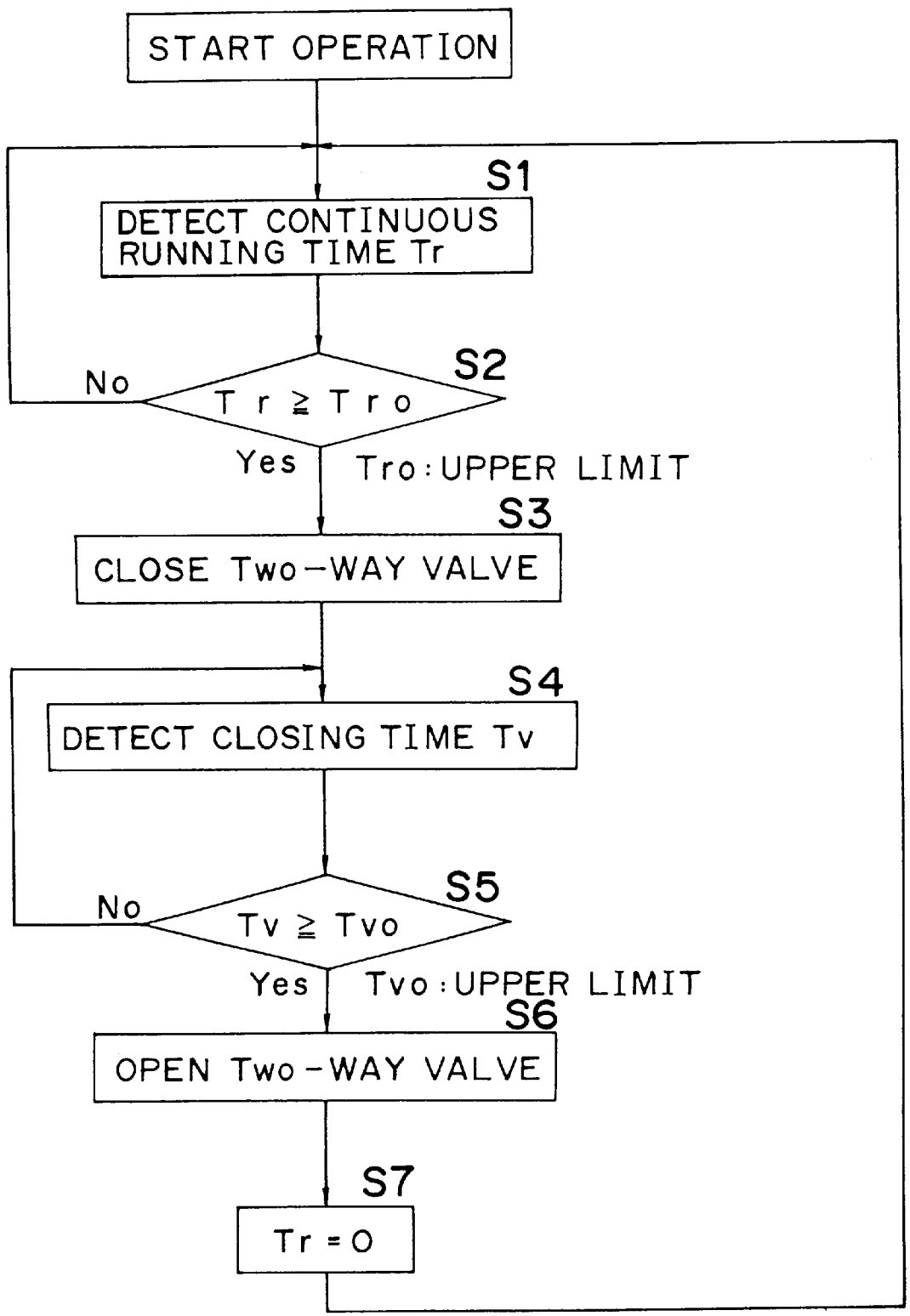
FIG. 6 is a flow-chart showing a method of controlling a two-way valve mounted in the oil level equalizing system according to the fourth embodiment of the present invention.

FIG. 5 is a view showing a refrigerating cycle of an air conditioning equipment employing the oil level equalizing system according to the fourth embodiment of the present invention. FIG. 6 is a flow-chart showing a method of controlling a two-way valve mounted in the oil level equalizing system.

In FIG. 5, an outdoor unit 1 of an air conditioning equipment comprises a plurality of low-pressure shell-type compressors 2a, 2b, 2c, a four-way valve 3 for switching the flowing direction of refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the suction side of the compressors 2a, 2b, 2c, and reference numerals 10a, 10b and 10c designate branch portions of the suction line 9.

An oil level equalizing line connecting line 12a, 12b, 12c is connected at its one end to each compressor 2a, 2b, 2c at a location adjacent to the normal oil level within its shell with its other end communicating with an oil level equalizing line 11. Reference numeral 13 designates a communication line for communicating the suction line 9 on the upstream side of the suction line branch portion 10a, 10b for each compressor 2a, 2b, 2c with the oil level equalizing line 11. Reference numeral 14 designate a two-way valve arranged in a midway portion of the communication line 13. When the two-way valve 14 is opened, the pressure within the oil level equalizing line 11 is higher than the pressures within the shells of the respective compressors 2a, 2b, 2c. Reference numeral 15 designates a two-way valve control means to close the two-way valve 14 only for a predetermined period of time Tvo when a continuous running time Tr for the cooling or the heating reaches a predetermined time Tro.

As described above, the oil level equalizing system according to the fourth embodiment of the present invention comprises the plurality of low-pressure shell-type compressors 2a, 2b, 2c, the oil level equalizing line connecting lines 12a, 12b, 12c arranged for the respective compressors 2a, 2b, 2c and each having one end communicating with the shell of the corresponding compressor 2a, 2b, 2c at a location adjacent to the normal oil level within the shell, the oil level equalizing line 11 communicating with the other ends of the respective connecting lines 12a, 12b, 12c, and a communication line 13 for communicating the suction line 9 on the upstream side of suction line branch portions 10a, 10b for the respective compressors 2a, 2b, 2c with the oil level equalizing line 11. The oil level equalizing system also comprises the two-way valve 14 arranged in the midway portion of the suction line 9 to increase the pressure within the oil level equalizing line 11 during the opening thereof to a value higher than the pressures within the shells of the respective compressors 2a, 2b, 2c, and the two-way valve control means to close the two-way valve 14 only for the certain period of time Tvo when the continuous running time Tr for the cooling or the heating reaches the predetermined time Tro.

Next, the operation of the two-way valve control means 15 will be explained with reference to the flow-chart of FIG. 6.

At step S1, the continuous running time Tr for the cooling or the heating is first detected. At step S2, if the continuous running time Tr is shorter than the predetermined upper limit continuous running time Tro, step S1 is resumed. In contrast, if the time Tr is longer than the predetermined upper limit time Tro, the procedure advances to step S3, at which the two-way valve 14 is closed. At step S4, a closing time Tv of the two-way valve 14 is detected. At step S5, if the two-way valve closing time Tv detected at step S4 is shorter than the predetermined upper limit two-way valve closing period of time Tvo, step S4 is resumed. In contrast, if the time Tv is longer than the predetermined upper limit time Tvo, the procedure advances to step S6, at which the two-way valve 14 is opened. At step S7, the continuous running time Tr is returned to zero, and the procedure returns to step S1.

Next, a method of adequately regulating the oil quantity in each compressor 2a, 2b 2c will be explained hereinafter.

It is assumed that the plurality of compressors 2a, 2b, 2c include such compressors as to have different capacities or variable capacities, and that the compressor 2a has a smaller capacity than those of the compressors 2b, 2c.

When the operations of all the compressors 2a, 2b, 2c are started, since the two-way valve 14 has been opened, the pressure within the oil level equalizing line 11 communicating with the suction line 9 on the upstream side of the suction line branch portion 10 through the communication line 13 is increased higher than the pressures within the shells of the compressors 2a, 2b, 2c. Therefore, the oil flowing out from the low-capacity compressor 2a to the oil level equalizing line connecting line 12a is blocked, so that oil level differentials do not occur which might be caused by the oil transfer due to internal pressure differentials between the shells of the respective compressors 2a, 2b, 2c.

When the continuous running time Tr for the cooling or the heating reaches the predetermined time Tro, the two-way valve 14 is closed, and the oil is transferred through the oil level equalizing line 11 from the low-capacity compressor 2a having a higher pressure within the shell to the high-capacity compressors 2b, 2c having lower pressures within the shells. Therefore, it becomes possible to prevent oil shortage after a long-time continuous running, which shortage might be caused when the return oil quantity is less than the delivery oil quantity in the high-capacity compressors 2b, 2c.

When the predetermined period of time Tvo has passed after the closing of the two-way valve 14, the two-way valve 14 is opened to stop the transfer of the oil through the oil level equalizing line 11.

As mentioned above, even when one or more compressors having different capacities or variable capacities are included among the plurality of compressors 2a, 2b, 2c, no oil transfers from the low-capacity compressor 2a to the high-capacity compressors 2b, 2c through the oil level equalizing line 11 if the two-way valve 14 is opened during the operation of the compressors 2a, 2b, 2c. Accordingly, it becomes possible to prevent shortage of the oil quantity within the low-capacity compressor 2a, which shortage may be caused by the oil transfer to the high-capacity compressors 2b, 2c through the equalizing line 11.

In general, since the oil quantity supplied to the compression chamber in the high-capacity compressors 2b, 2c is greater than that in the low-capacity compressor 2a, the oil content within the delivered refrigerant is greater than that in the low-capacity compressor 2a. However, since the delivered refrigerants from the respective compressors 2a, 2b, 2c are joined after the delivery, the oil contents within the refrigerants drawn into the respective compressors 2a, 2b, 2c after being divided at the suction line branch portions 10a, 10b are equal to one another. Therefore, since the return oil quantity is less than the delivery oil quantity in each high-capacity compressor 2a, 2b, 2c, when the non-stop operation is continued for a long period of time, the oil quantity gradually decreases and oil shortage occurs before long.

However, when the continuous running time Tr reaches the predetermined time Tro, the two-way valve 14 is closed only for the certain period of time Tvo so that the oil transfers from the low-capacity compressor 2a to the high-capacity compressors 2b, 2c through the oil level equalizing line 11. Therefore, it becomes possible to prevent oil shortage, which may be caused when the return oil quantity is less than the delivery oil quantity, after the long time continuous operation. In this way, the adequate oil quantity can be maintained in each compressor 2a, 2b, 2c.

In addition to the construction of the first embodiment, this embodiment is provided with the two-way valve 14 arranged at a midway portion of the communication line 13 for increasing the pressure within the oil level equalizing line 11 to a value higher than the pressures within the shells of the respective compressors 2a, 2b, 2c during the valve opening, and with the two-way valve control means 15 adapted to close the two-way valve 14 only for the certain period of time Tvo when the continuous running time Tr for the cooling or the heating reaches the predetermined time Tro. However, this embodiment may be provided, in addition to the construction of the second embodiment, with the two-way valve adapted to increase the pressure within the oil level equalizing line 11 during the opening of the valve arranged in the midway portion of the communication line 22 to a value higher than the pressures within the shells of the respective compressors 2a, 2b, 2c, and with the two-way valve control means adapted to close the two-way valve only for the certain period of time Tvo when the continuous running time Tr for the cooling or the heating has reached the predetermined time Tro. Alternatively, this embodiment may be provided, in addition to the construction of the third embodiment, with the two-way valve arranged in the midway portion of the communication line 24 so as to increase the pressure within the equalizing line 11 during the valve opening to a value higher than the pressures within the shells of the respective compressors 2a, 2b, 2c, and with the two-way valve control means adapted to close the two-way valve only for the certain period of time Tvo when the continuous running time Tr for the cooling or the heating has reached the predetermined time Tro.

An oil level equalizing system for plural compressors according to a fifth embodiment of the present invention will be explained hereinafter.

Figure 7:
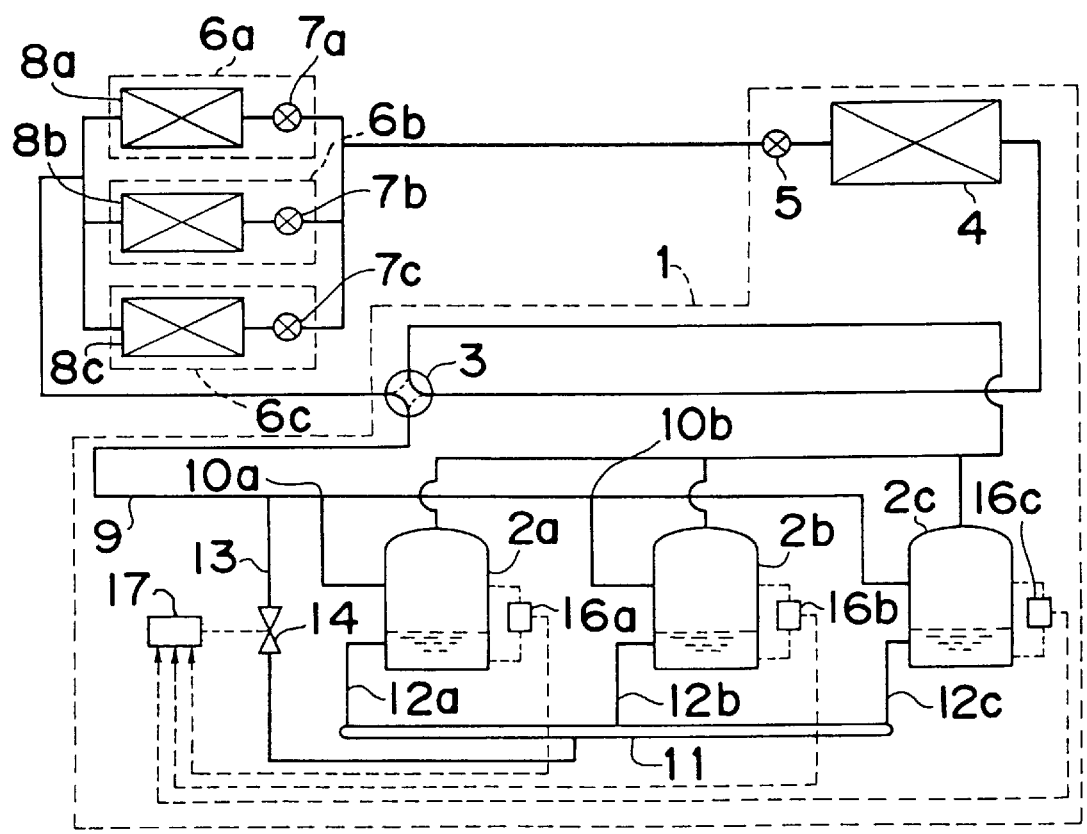
FIG. 7 is a diagram similar to FIG. 1, but according to a fifth embodiment of the present invention.
Figure 8:
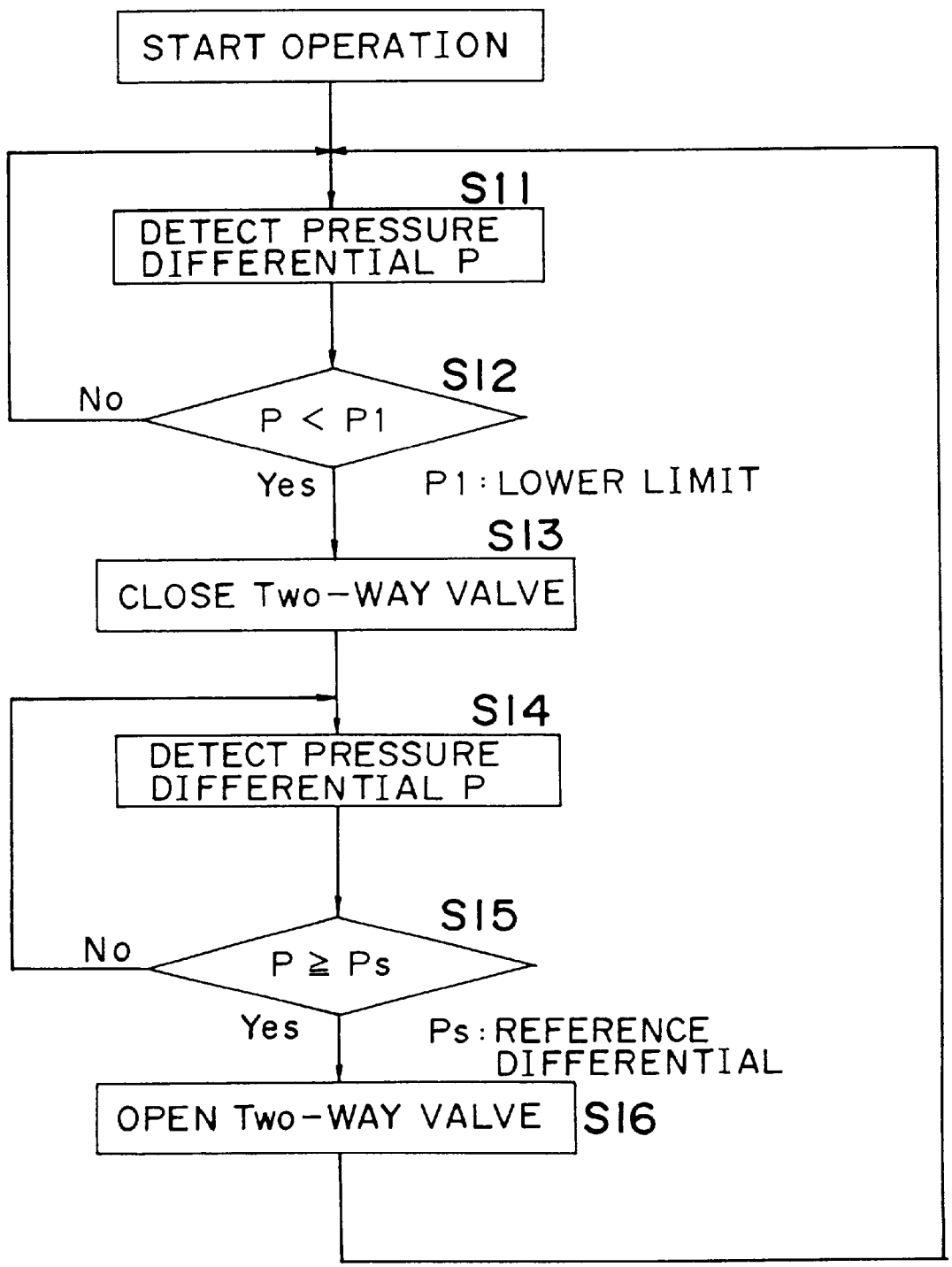
FIG. 8 is a flow-chart showing a method of controlling a two-way valve mounted in the oil level equalizing system according to the fifth embodiment of the present invention.

FIG. 7 is a view showing a refrigerating cycle of an air conditioning equipment employing the oil level equalizing system according to the fifth embodiment of the present invention. FIG. 8 is a flow-chart showing a method of controlling a two-way valve mounted in the oil level equalizing system.

In FIG. 7, an outdoor unit 1 of the air conditioning equipment comprises a plurality of low-pressure shell-type compressors 2a, 2b, 2c, a four-way valve 3 for switching the flowing direction of refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the suction side of the compressors 2a, 2b, 2c, and reference numerals 10a, 10b and 10c designate branch portions of the suction line 9.

An oil level equalizing line connecting line 12a, 12b, 12c is connected at its one end to each compressor 2a, 2b, 2c at a location adjacent to the normal oil level within its shell with its other end communicating with an oil level equalizing line 11. Reference numeral 13 designates a communication line for communicating the suction line 9 on the upstream side of the suction line branch portion 10a, 10b for each compressor 2a, 2b, 2c with the oil level equalizing line 11. Reference numeral 14 designates a two-way valve arranged in a midway portion of the communication line 13.

When the two-way valve 14 is opened, the pressure within the equalizing line 11 is higher than the pressures within the shells of the respective compressors 2a, 2b, 2c. Reference numerals 16a, 16b, 16c designate pressure differential detecting units (for example, pressure differential sensors, or two pressure sensors) for detecting the pressure differential between the shell upper portion and the shell lower portion of each compressor 2a, 2b, 2c. Reference numeral 17 designates a two-way valve control means which closes the two-way valve 14 when the pressure differential P between the shell upper portion and the shell lower portion detected by at least one of the pressure differential detecting units 16a, 16b, 16c becomes smaller than a predetermined lower limit pressure differential P1, and opens the two-way valve 14 when the pressure differentials P between the shell upper portions and the shell lower portions detected by all the pressure differential detecting units 16a, 16b, 16c become equal to or larger than a predetermined reference pressure differential Ps.

The oil level equalizing system according to the fifth embodiment comprises the plurality of low-pressure shell-type compressors 2a, 2b, 2c, the oil level equalizing line connecting lines 12a, 12b, 12c arranged for the respective compressors 2a, 2b, 2c and each having one end communicating with the shell of the corresponding compressor 2a, 2b or 2c at a location adjacent to the normal oil level within the shell, the oil level equalizing line 11 communicating with the other ends of the respective connecting lines 12a, 12b, 12c, the communication line 13 for communicating the suction line 9 on the upstream side of suction line branch portions 10a, 10b for the respective compressors 2a, 2b, 2c with the equalizing line 11, and the two-way valve 14 arranged in the midway portion of the suction line 9 to increase the pressure within the oil level equalizing line 11 during the opening thereof to a value higher than the pressures within the shells of the respective compressors 2a, 2b, 2c. As described above, the oil level equalizing system further comprises the pressure differential detecting units 16a, 16b, 16c and the two-way valve control means 17.

Next, the operation of the two-way valve control means 17 will be explained with reference to the flow-chart of FIG. 8.

At step S11, the pressure differentials P between the shell upper portions and the shell lower portions of the compressors 2a, 2b, 2c are detected by the pressure differential detecting units 16a, 16b, 16c, respectively. At step S12, if the pressure differential P detected at step S11 for at least one of the compressors 2a, 2b, 2c is equal to or larger than the predetermined lower limit pressure differential P1, the procedure returns to step S11. If it is smaller than the predetermined lower limit pressure differential P1, the procedure advances to step S13, at which the two-way valve 14 is closed. At step S14, the pressure differentials P between the shell upper portions and the shell lower portions of the compressors 2a, 2b, 2c are detected by the pressure differential detecting units 16a, 16b, 16c, respectively. At step S15, if the pressure differentials P detected at step S14 for all the compressors 2a, 2b, 2c are smaller than the predetermined reference pressure differential Ps, the procedure returns to step S14. If it is equal to or larger than the predetermined reference pressure differential Ps, the procedure advances to step S16, at which the two-way valve 14 is opened. Thereafter, the procedure returns to step S11.

Next, a method of adequately regulating the oil quantity in each compressor 2a, 2b, 2c will be explained hereinafter.

It is first assumed that the plurality of compressors 2a, 2b, 2c include one or more compressors of different capacities or variable capacities, and that the compressor 2a has a smaller capacity than those of the compressors 2b, 2c.

When the operations of all the compressors 2a, 2b, 2c are started, since the two-way valve 14 has been opened, the pressure within the oil level equalizing line 11 communicating through the communication line 13 with the suction line 9 on the upstream side of the suction line branch portion 10 is increased higher than the pressures within the shells of the compressors 2a, 2b, 2c. Therefore, the oil flowing out from the low-capacity compressor 2a to the oil level equalizing line connecting line 12a is blocked, so that oil level differentials do not occur which might be caused by the oil transfer due to internal pressure differentials between the shells of the respective compressors 2a, 2b, 2c.

When the oil quantities of the compressors 2a, 2b, 2c decrease, the oil levels lower and the pressure differentials P between the shell upper portions and the shell lower portions become smaller. In contrast, when the oil quantities of the compressors 2a, 2b, 2c increase, the oil levels rise and the pressure differentials P between the shell upper portions and the shell lower portions become larger.

Accordingly, when the oil levels of the compressors 2b, 2c decrease and the pressure differentials P between the shell upper portions and the shell lower portions thereof become smaller than the lower limit pressure differential P1, the two-way valve 14 is closed and the oil transfers through the oil level equalizing line 11 from the low-capacity compressor 2a having the higher pressure within its shell to the high-capacity compressors 2b, 2c having the lower pressures within their shells. Then, when the oil quantities of the compressor 2b, 2c increase and the pressure differentials between the shell upper portions and the shell lower portions thereof become equal to or larger than the reference pressure differential Ps, the two-way valve 14 is opened and the oil transfer through the equalizing line 11 is stopped.

As described above, even when one or more compressors having different capacities or variable capacities are included among the plurality of compressors 2a, 2b, 2c, no oil transfers from the low-capacity compressor 2a to the high-capacity compressors 2b, 2c through the equalizing line 11 if the two-way valve 14 is opened during the operation of the compressors 2a, 2b, 2c. Accordingly, it becomes possible to prevent oil shortage within the low-capacity compressor 2a, which shortage would be caused by the oil transfer to the high-capacity compressors 2b, 2c through the equalizing line 11.

In general, since the oil quantity supplied to the compression chamber in each high-capacity compressor 2b, 2c is greater than that in the low-capacity compressor 2a, the oil content within the delivered refrigerant is larger than that in the low-capacity compressor 2a. However, since the delivered refrigerants from the respective compressors 2a, 2b, 2c are joined after the delivery, the oil contents within the refrigerants drawn into the respective compressors 2a, 2b, 2c after being divided at the suction line branch portions 10a, 10b are equal to one another. Therefore, since the return oil quantity is less than the delivery oil quantity in each high-capacity compressor 2b, 2c, when the non-stop operation is continued for a long period of time, the oil quantity gradually decreases and oil shortage occurs before long.

However, when the oil quantities in the high-capacity compressors 2b, 2c decrease so that the pressure differentials P between the shell upper portions and the shell lower portions thereof become less than the lower limit pressure differentials P1, the two-way valve 14 is closed until the oil quantities increase to such an extent that the pressure differentials P between the shell upper portions and the shell lower portions thereof become equal to or larger than the reference pressure differential Ps. Accordingly, the oil transfers from the low-capacity compressor 2a to the high-capacity compressors 2b, 2c through the oil level equalizing line 11. Therefore, it becomes possible to prevent oil shortage, which has been hitherto caused when the return oil quantity is less than the delivery oil quantity in the high-capacity compressors 2b, 2c, after the long time non-stop running.

Further, since the oil shortages in the respective compressors 2a, 2b, 2c are detected by the pressure differentials P between the shell upper portions and the shell lower portions, the two-way valve 14 can be controlled accurately without being affected by variations in the oil delivery quantity and the oil return quantity of the compressors 2a, 2b, 2c which may be caused under different operating conditions. Accordingly, it becomes possible to prevent oil shortage in the high-capacity compressors 2b, 2c which would be caused by delayed closing of the two-way valve 14 or early opening of the two-way valve 14 after the closing, and also to prevent oil shortage in the low-capacity compressor 2a which would be caused by early or delayed opening of the two-way valve 14 after the closing. It is therefore possible to maintain the adequate oil quantities in the respective compressors 2a, 2b, 2c.

This embodiment is provided, in addition to the construction of the first embodiment, with the two-way valve 14 arranged at a midway portion of the communication line 13 for increasing the pressure within the oil level equalizing line 11 to a value higher than the pressures within the shells of the respective compressors 2a, 2b, 2c during the valve opening, the pressure differential detecting units 16a, 16b, 16c for detecting the pressure differential between the shell upper portion and the shell lower portion of each compressor 2a, 2b, 2c, and the two-way valve control means 17 for closing the two-way valve 14 when the pressure differential P between the shell upper portion and the shell lower portion detected by at least one of the pressure differential detecting units 16a, 16b, 16c becomes smaller than the predetermined lower limit pressure differential P1, and for subsequently opening the two-way valve 14 when the pressure differentials P between the shell upper portions and the shell lower portions detected by the pressure differential detecting units 16a, 16b, 16c of all the compressors 2a, 2b, 2c become equal to or larger than the predetermined reference pressure differential Ps. Alternatively, this embodiment may be provided, in addition to the construction of the second embodiment, with the two-way valve arranged at a midway portion of the communication line 22 for increasing the pressure within the oil level equalizing line 11 to a value higher than the pressures within the shells of the respective compressors 2a, 2b, 2c during the valve opening, the pressure differential detecting units 16a, 16b, 16c for detecting the pressure differential between the shell upper portion and the shell lower portion of each compressor 2a, 2b, 2c, and the two-way valve control means 17 for closing the two-way valve 14 when the pressure differential P between the shell upper portion and the shell lower portion detected by at least one of the pressure differential detecting units 16a, 16b, 16c becomes smaller than the predetermined lower limit pressure differential P1, and for subsequently opening the two-way valve 14 when the pressure differentials P between the shell upper portions and the shell lower portions detected by the pressure differential detecting units 16a, 16b, 16c of all the compressors 2a, 2b, 2c become equal to or larger than the predetermined reference pressure differential Ps. Again alternatively, this embodiment may be provided, in addition to the construction of the third embodiment, with the two-way valve arranged at a midway portion of the communication line 24 for increasing the pressure within the oil level equalizing line 11 to a value higher than the pressures within the shells of the respective compressors 2a, 2b, 2c during the valve opening, the pressure differential detecting units 16a, 16b, 16c for detecting the pressure differential between the shell upper portion and the shell lower portion of each compressor 2a, 2b, 2c, and the two-way valve control means for closing the two-way valve 14 when the pressure differential P between the shell upper portion and the shell lower portion detected by at least one of the pressure differential detecting units 16a, 16b, 16c becomes less than the predetermined lower limit pressure differential P1, and for subsequently opening the two-way valve 14 when the pressure differentials P between the shell upper portions and the shell lower portions detected by the pressure differential detecting units 16a, 16b, 16c of all the compressors 2a, 2b, 2c become equal to or larger than the predetermined reference pressure differential Ps.

An oil level equalizing system for plural compressors according to a sixth embodiment of the present invention will be explained hereinafter.

Figure 9:
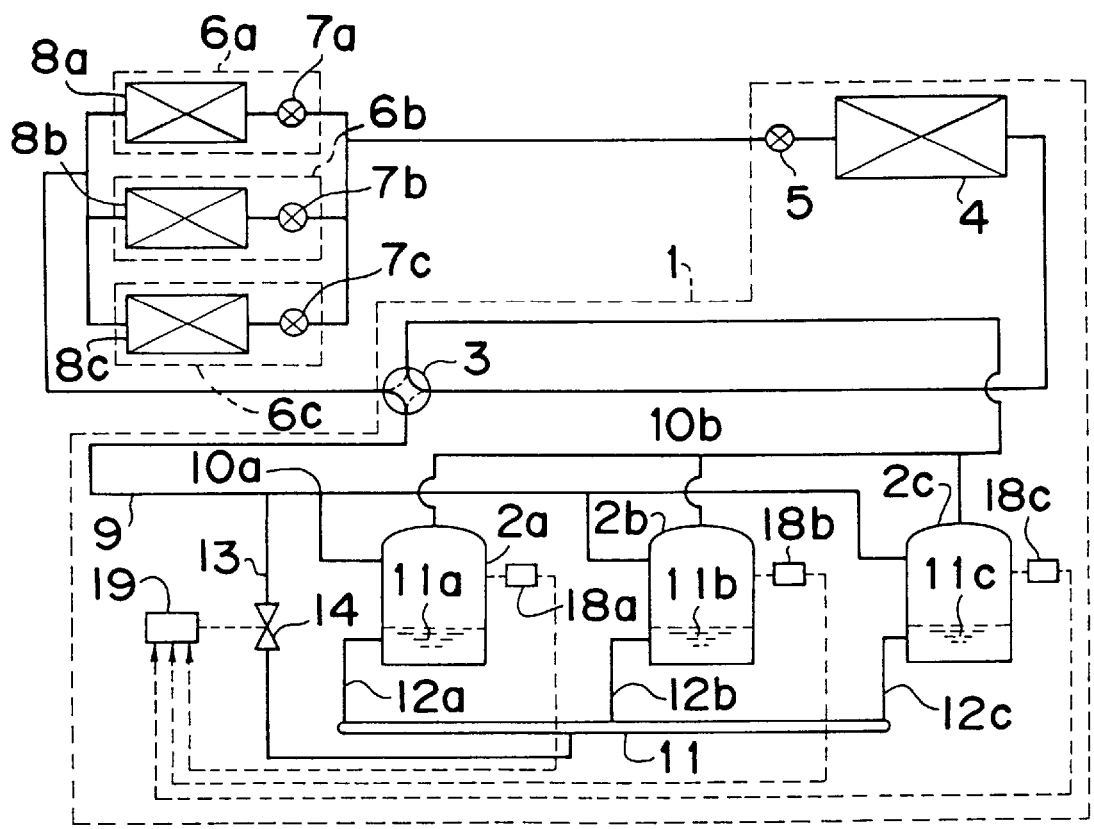
FIG. 9 is a diagram similar to FIG. 1, but according to a sixth embodiment of the present invention.
Figure 10:
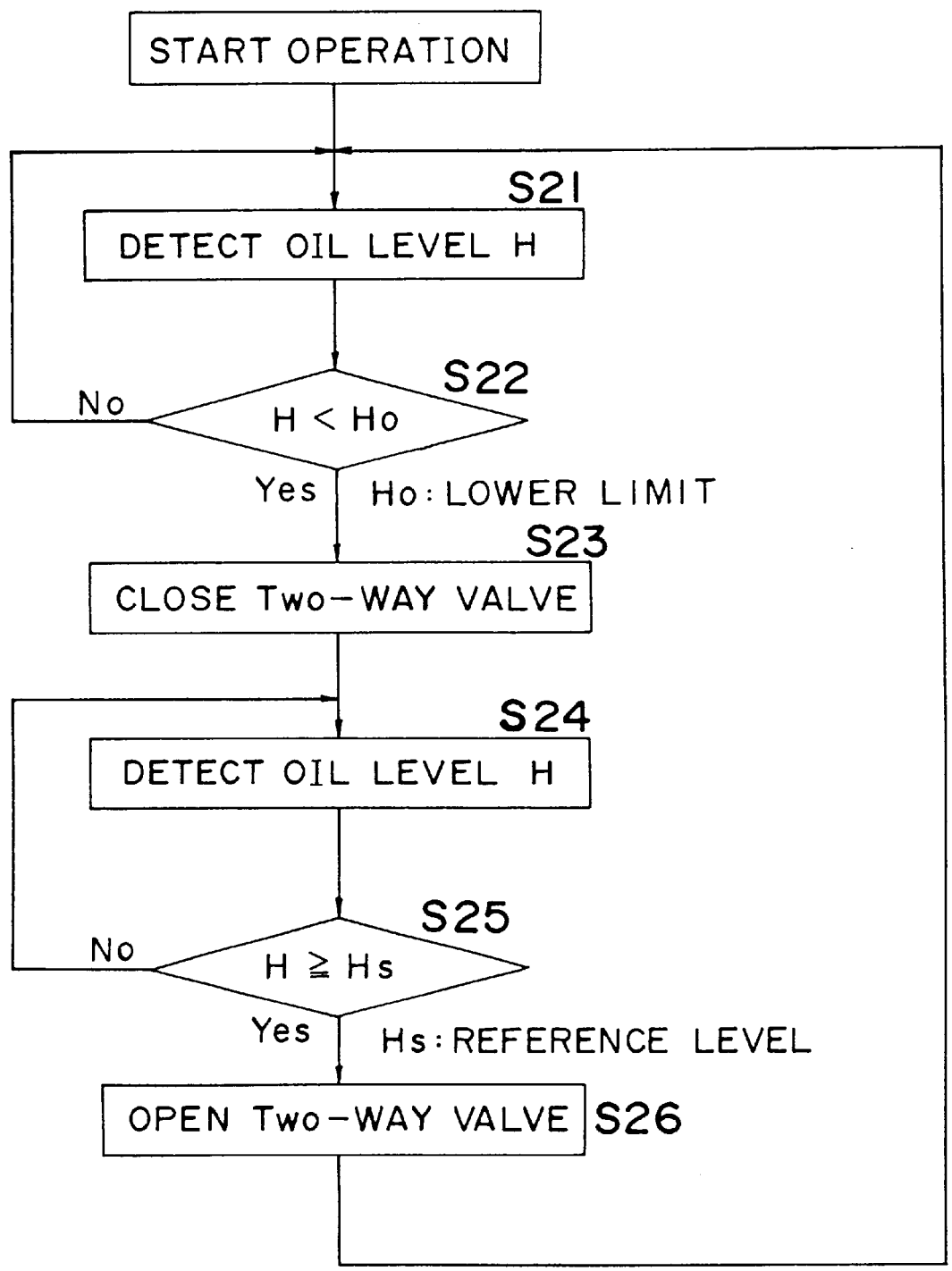
FIG. 10 is a flow-chart showing a method of controlling a two-way valve mounted in the oil level equalizing system according to the sixth embodiment of the present invention.

FIG. 9 is a view showing a refrigerating cycle of an air conditioning equipment employing the oil level equalizing system according to the sixth embodiment of the present invention. FIG. 10 is a flow-chart showing a method of controlling a two-way valve mounted in the oil level equalizing system.

In FIG. 9, an outdoor unit 1 of an air conditioning equipment comprises a plurality of low-pressure shell-type compressors 2a, 2b, 2c, a four-way valve 3 for switching the flowing direction of refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the suction side of the compressors 2a, 2b, 2c, and reference numerals 10a, 10b and 10c designate branch portions of the suction line 9.

An oil level equalizing line connecting line 12a, 12b, 12c is connected at its one end to each compressor 2a, 2b, 2c at a location adjacent to the normal oil level within its shell with its other end communicating with an oil level equalizing line 11. Reference numeral 13 designates a communication line for communicating the suction line 9 on the upstream side of the suction line branch portion 10a, 10b for each compressor 2a, 2b, 2c with the oil level equalizing line 11. Reference numeral 14 designates a two-way valve arranged in a midway portion of the communication line 13. When the two-way valve 14 is opened, the pressure within the equalizing line 11 is higher than the pressures within the shells of the respective compressors 2a, 2b, 2c. Reference numerals 18a, 18b, 18c designate oil level detecting units (for example, a plurality of float switches) for detecting oil levels H in the compressors 2a, 2b, 2c. Reference numeral 19 designates a two-way valve control means for closing the two-way valve 14 when the oil level H detected by at least one of the oil level detecting units 18a, 18b, 18c becomes lower than a predetermined lower limit oil level Ho and for opening the two-way valve 14 when the oil levels H then detected by the oil level detecting units 18a, 18b, 18c of all the compressors 2a, 2b, 2c become equal to or more than a predetermined reference oil level Hs.

The oil level equalizing system for plural compressors according to the sixth embodiment of the present invention comprises the plurality of low-pressure shell-type compressors 2a, 2b, 2c, the oil level equalizing line connecting lines 12a, 12b, 12c arranged for the respective compressors 2a, 2b, 2c and each having one end communicating with the shell of the corresponding compressor 2a, 2b or 2c at a location adjacent to the normal oil level within the shell, the oil level equalizing line 11 communicating with the other ends of the respective connecting lines 12a, 12b, 12c, a communication line 13 for communicating the suction line 9 on the upstream side of suction line branch portions 10a, 10b for the respective compressors 2a, 2b, 2c with the oil level equalizing line 11, the two-way valve 14 arranged in the midway portion of the communication line 13 to increase the pressure within the oil level equalizing line 11 during the opening thereof to a value higher than the pressures within the shells of the respective compressors 2a, 2b, 2c, the oil level detecting units 18a, 18b, 18c for detecting oil levels H in the compressors 2a, 2b, 2c, and the two-way valve control means 19 for closing the two-way valve 14 when the oil level H detected by at least one of the oil level detecting units 16a, 16b, 16c becomes lower than a predetermined lower limit oil level Ho and for opening the two-way valve 14 when the oil levels H then detected by the oil level detecting units 18a, 18b, 18c of all the compressors 2a, 2b, 2c become equal to or more than the predetermined reference oil level Hs.

The operation of the two-way valve control means 19 will be explained with reference to the flow-chart of FIG. 10.

At step S21, the oil levels H in the compressors 2a, 2b, 2c are detected by the oil level detecting units 18a, 18b, 18c, respectively. At step S22, if the oil level H detected at step S21 for at least one of the compressors 2a, 2b, 2c is equal to or more than the predetermined lower limit oil level Ho, step S21 is resumed. If it is less than the predetermined lower limit oil level Ho, the procedure advances to step S23, at which the two-way valve 14 is closed. At step S24, the oil levels H in the compressors 2a, 2b, 2c are detected by the oil level detecting units 18a, 18b, 18c, respectively. At step S25, if the oil levels H in all the compressors 2a, 2b, 2c are less than the predetermined reference oil level Hs, step S24 is resumed. If it is equal to or more than the predetermined reference oil level Hs, the procedure advances to step S26, at which the two-way valve 14 is opened, and the procedure returns to step S21.

Next, a method of adequately regulating the oil quantity in each compressor 2a, 2b, 2c will be explained hereinafter.

It is assumed that the plurality of compressors 2a, 2b, 2c include such compressors as to have different capacities or variable capacities, and that the compressor 2a has a smaller capacity than those of the compressors 2b, 2c.

First, when the operations of all the compressors 2a, 2b, 2c are started, since the two-way valve 14 has been opened, the pressure within the oil level equalizing line 11 communicating with the suction line 9 through the communication line 13 is increased higher than the pressures within the shells of the compressors 2a, 2b, 2c. Therefore, the oil flowing out from the low-capacity compressor 2a to the connecting line 12a is blocked, so that oil level differentials do not occur which might be caused by the oil transfer due to internal pressure differentials between the shells of the respective compressors 2a, 2b, 2c.

When the oil quantities of the compressors 2b, 2c decrease and the oil levels H thereof become less than the lower limit oil level Ho, the two-way valve 14 is closed and the oil transfers through the oil level equalizing line 11 from the low-capacity compressor 2a having the higher pressure within its shell into the high-capacity compressors 2b, 2c having the lower pressures within their shells. Then, when the oil quantities of the compressor 2b, 2c increase and the oil levels H thereof become equal to or more than the reference oil level Hs, the two-way valve 14 is opened and the oil transfer through the oil level equalizing line 11 is stopped.

As described above, even when one or more compressors having different capacities or variable capacities are included among the plurality of compressors 2a, 2b, 2c, no oil transfers from the low-capacity compressor 2a to the high-capacity compressors 2b, 2c through the equalizing line 11 if the two-way valve 14 is opened during the operation of the compressors 2a, 2b, 2c. Accordingly, it becomes possible to prevent oil shortage within the low-capacity compressor 2a which would be caused by the oil transfer to the high-capacity compressors 2b, 2c through the equalizing line 11.

In general, since the oil quantity supplied to the compression chamber in the high-capacity compressors 2b, 2c is more than that in the low- capacity compressor 2a, the oil content within the delivered refrigerant is larger than that in the low-capacity compressor 2a. However, since the delivered refrigerants from the respective compressors 2a, 2b, 2c are joined after the delivery, the oil contents within the refrigerants drawn into the respective compressors 2a, 2b, 2c after being divided at the suction line branch portions 10a, 10b are equal to one another. Therefore, since the return oil quantity is less than the delivery oil quantity in each high-capacity compressor 2b, 2c, when the non-stop operation is continued for a long period of time, the oil quantity gradually decreases and oil shortage occurs before long.

However, when the oil quantities in the high-capacity compressors 2b, 2c decrease to such an extent that the oil levels H thereof become lower than the lower limit oil levels Ho, the two-way valve 14 is closed until the oil quantities increase and the oil levels H thereof become equal to or higher than the reference oil level Hs so that the oil transfers from the low-capacity compressor 2a to the high-capacity compressors 2b, 2c through the oil level equalizing line 11. Therefore, it becomes possible to prevent oil shortage, which would be caused when the return oil quantity is less than the delivery oil quantity in the high-capacity compressors 2b, 2c, after the long time non-stop running.

Further, since the oil shortages in the respective compressors 2a, 2b, 2c are detected by the oil levels, the two-way valve 14 can be controlled accurately without being affected by variations in the oil delivery quantity and the oil return quantity of the compressors 2a, 2b, 2c which may be caused under different operation conditions. Accordingly, it becomes possible to prevent oil shortage in the high-capacity compressors 2b, 2c which would be caused by delayed closing of the two-way valve 14 or early opening of the two-way valve 14 after the closing, and also to prevent oil shortage in the low-capacity compressor 2a which would be caused by delayed opening of the two-way valve 14 after the closing. In this way, it is possible to maintain the adequate oil quantities in the respective compressors 2a, 2b, 2c.

This embodiment is provided, in addition to the construction of the first embodiment, with the two-way valve 14 arranged at a midway portion of the communication line 13 for increasing the pressure within the oil level equalizing line 11 to a value higher than the pressures within the shells of the respective compressors 2a, 2b, 2c during the valve opening, the oil level detecting units 18a, 18b, 18c for detecting the oil levels H in the compressors 2a, 2b, 2c, and the two-way valve control means 19 for closing the two-way valve 14 when the oil level H detected by at least one of the oil level detecting units 16a, 16b, 16c becomes lower than the predetermined lower limit oil level Ho and for subsequently opening the two-way valve 14 when the oil levels H detected by the oil level detecting units 16a, 16b, 16c of all the compressors 2a, 2b, 2c become equal to or higher than the predetermined reference oil level Hs. Alternatively, this embodiment may be provided, in addition to the construction of the second embodiment, with the two-way valve arranged at a midway portion of the communication line 22 for increasing the pressure within the oil level equalizing line 11 to a value higher than the pressures within the shells of the respective compressors 2a, 2b, 2c during the valve opening, the oil level detecting units 18a, 18b, 18c for detecting the oil levels H in the compressors 2a, 2b, 2c, and the two-way valve control means 19 for closing the two-way valve 14 when the oil level H detected by at least one of the oil level detecting units 16a, 16b, 16c becomes lower than the predetermined lower limit oil level Ho, and for subsequently opening the two-way valve 14 when the oil levels H detected by the oil level detecting units 16a, 16b, 16c of all the compressors 2a, 2b, 2c become equal to or higher than the predetermined reference oil level Hs. Again alternatively, this embodiment may be provided, in addition to the construction of the third embodiment, with the two-way valve arranged at a midway portion of the communication line 24 for increasing the pressure within the oil level equalizing line 11 to a value higher than the pressures within the shells of the respective compressors 2a, 2b, 2c during the valve opening, the oil level detecting units 18a, 18b, 18c for detecting the oil levels H in the compressors 2a, 2b, 2c, and the two-way valve control means 19 for closing the two-way valve 14 when the oil level H detected by at least one of the oil level detecting units 16a, 16b, 16c becomes lower than the predetermined lower limit oil level Ho, and for subsequently opening the two-way valve 14 when the oil levels H detected by the oil level detecting units 16a, 16b, 16c of all the compressors 2a, 2b, 2c become equal to or higher than the predetermined reference oil level Hs.

An oil level equalizing system for plural compressors according to a seventh embodiment of the present invention will be explained hereinafter.

Figure 11:
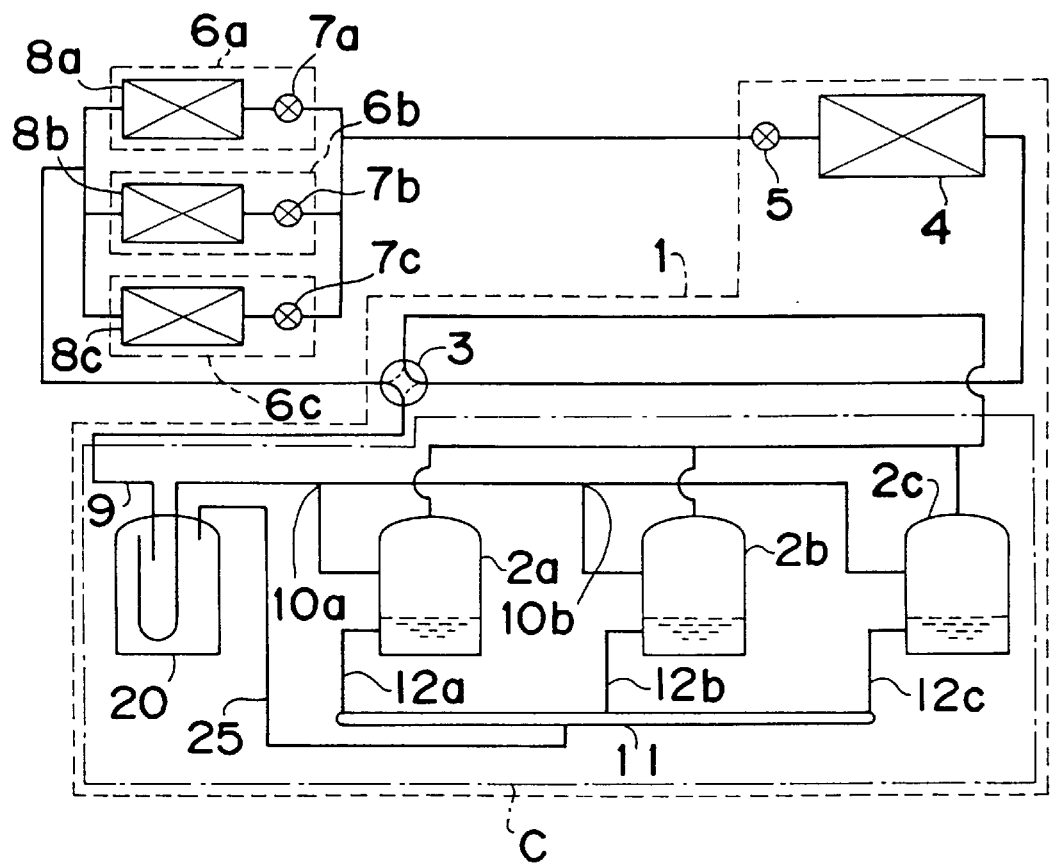
FIG. 11 is a diagram similar to FIG. 1, but according to a seventh embodiment of the present invention.
Figure 12:
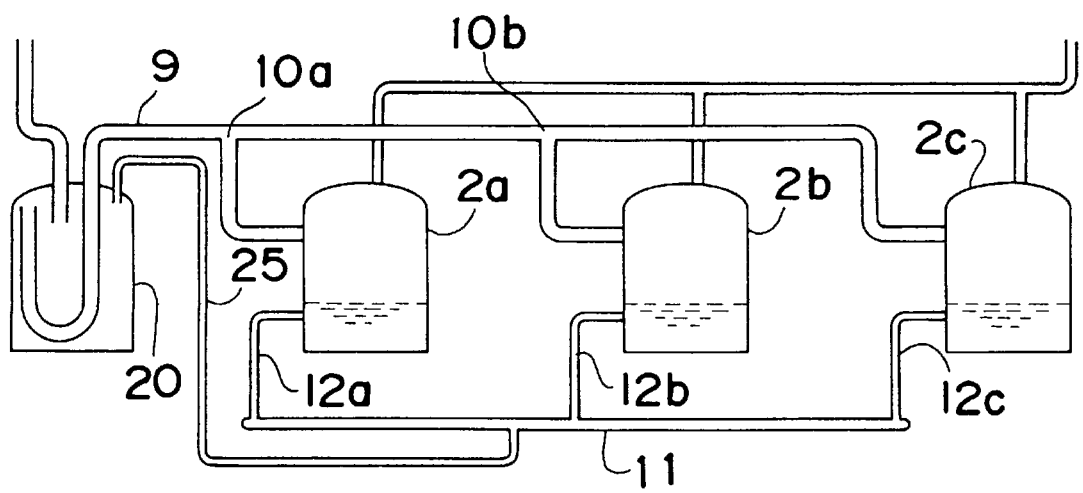
FIG. 12 is a detailed view of a portion denoted by C in FIG. 11.

FIG. 11 is a view showing a refrigerating cycle of an air conditioning equipment employing the oil level equalizing system according to the seventh embodiment of the present invention. FIG. 12 is a detailed view of a portion denoted by C in FIG. 11.

In FIGS. 11 and 12, an outdoor unit 1 of the air conditioning equipment comprises a plurality of low-pressure shell-type compressors 2a, 2b, 2c, a four-way valve 3 for switching the flowing direction of refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the suction side of the compressors 2a, 2b, 2c, and reference numerals 10a, 10b and 10c designate branch portions of the suction line 9.

An oil level equalizing line connecting line 12a, 12b, 12c is connected at its one end to each compressor 2a, 2b, 2c at a location adjacent to the normal oil level within its shell with its other end communicating with an oil level equalizing line 11. Reference numeral 20 designates an accumulator arranged in the suction line 9 on the upstream side of the suction line branch portion 10a, 10b for each compressor 2a, 2b, 2c. Reference numeral 25 designates a communication line for increasing the pressure within the oil level equalizing line 11 to a value higher than the pressures within the shells of the respective compressors 2a, 2b, 2c by communicating an upper gas refrigerant portion of the accumulator 20 with the equalizing line 11.

The oil level equalizing system according to the seventh embodiment of the present invention comprises the plurality of low-pressure shell-type compressors 2a, 2b, 2c, the oil level equalizing line connecting lines 12a, 12b, 12c arranged for the respective compressors 2a, 2b, 2c and each having one end communicating with the shell of the corresponding compressor 2a, 2b, 2c at a location adjacent to the normal oil level within the shell, the oil level equalizing line 11 communicating with the other ends of the respective connecting lines 12a, 12b, 12c, the accumulator 20 arranged in the suction line 9 on the upstream side of the suction line branch portion 10a, 10b for each compressor 2a, 2b, 2c, and the communication line 25 for increasing the pressure within the oil level equalizing line 11 to a value higher than the pressures within the shells of the respective compressors 2a, 2b, 2c by communicating the upper gas refrigerant portion of the accumulator 20 with the equalizing line 11.

Next, a method of adequately regulating the oil quantity in each compressor 2a, 2b, 2c will be explained hereinafter.

It is first assumed that the plurality of compressors 2a, 2b, 2c include one or more compressors of different capacities or variable capacities and that the compressor 2a has a smaller capacity than those of the compressors 2b, 2c.

When all the compressors 2a, 2b, 2c are operated, the pressure within the oil level equalizing line 11 communicating with the upper gas refrigerant portion within the accumulator 20 through the communication line 25 is increased higher than the pressures within the shells of the compressors 2a, 2b, 2c. Therefore, the oil flowing out from the low-capacity compressor 2a to the connecting line 12a is blocked, so that oil level differentials do not occur which might be caused by the oil transfer due to internal pressure differentials between the shells of the respective compressors 2a, 2b, 2c.

Since the inlet port of the communication line 25 is located at an upper portion within the accumulator 20 within which only the gas refrigerant from which the oil is separated exists, only the gas refrigerant containing no oil flows through the communication line 25.

When studying the delivery oil quantity in the absence of the oil transfer, since the oil quantity supplied to a compression chamber of each high-capacity compressor 2b, 2c is generally more than that for the low-capacity compressor 2a, the oil content of the delivered refrigerant thereof is higher than that in the low-capacity compressor 2a. On the other hand, when studying the return oil quantity, since the oil contents of the refrigerants in the suction lines 9 to the respective compressors 2a, 2b, 2c are equal to one another, the return oil quantities to the respective compressors 2a, 2b, 2c are in proportion to circulating refrigerant quantities in the respective compressors 2a, 2b, 2c.

As mentioned above, since the oil content of the delivered refrigerant in each high-capacity compressor 2b, 2c is high, the quantity of the delivered oil is large. On the other hand, the oil quantity returned from the suction line 9 is in proportion to the circulating quantity. Accordingly, the returned oil quantity is less than the delivered oil quantity and, hence, when the non-stop operation is continued (for example, 20 hours), the oil quantity gradually decreases.

However, when all the compressors 2a, 2b, 2c stop for a certain period of time (for example, 5 minutes) at predetermined time intervals (for example, 10 hours), the pressures within the refrigerating cycle are equalized and the oils transfer through the oil level equalizing line 11 to equalize the oil levels in the respective compressors 2a, 2b, 2c, thus regulating the oil quantity.

As described above, when even one of the compressors 2a, 2b, 2c is operated, the pressure within the equalizing line 11 becomes higher than those within the shells of the respective compressors 2a, 2b, 2c so that the oils in the respective compressors 2a, 2b, 2c do not transfer to the equalizing line 11.

Accordingly, in applications where one or more compressors having different capacities or variable capacities are included among the plurality of compressors 2a, 2b, 2c, even when the pressure differentials between the shells of the respective compressors 2a, 2b, 2c occur, no oil transfers from the low-capacity compressor 2a to the high-capacity compressors 2b, 2c through the oil level equalizing line 11. Accordingly, it becomes possible to prevent oil shortage within the low-capacity compressor 2a for a long period of time and to continue the non-stop operation for a long time.

Further, when all the compressors 2a, 2b, 2c stop for a predetermined period of time at predetermined time intervals, the pressures within the refrigerating cycle are equalized and the oil transfers through the oil level equalizing line 11 to equalize the oil levels in the respective compressors 2a, 2b, 2c, thus regulating the oil quantity and maintaining the adequate oil levels in the respective compressors 2a, 2b, 2c.

Since the gas refrigerant separated by the accumulator 20 is introduced into the oil level equalizing line 11, there is little oil in this gas refrigerant and thus the non-stop operation can be further extended.

An oil level equalizing system for plural compressors according to an eighth embodiment of the present invention will be explained hereinafter.

Figure 13:
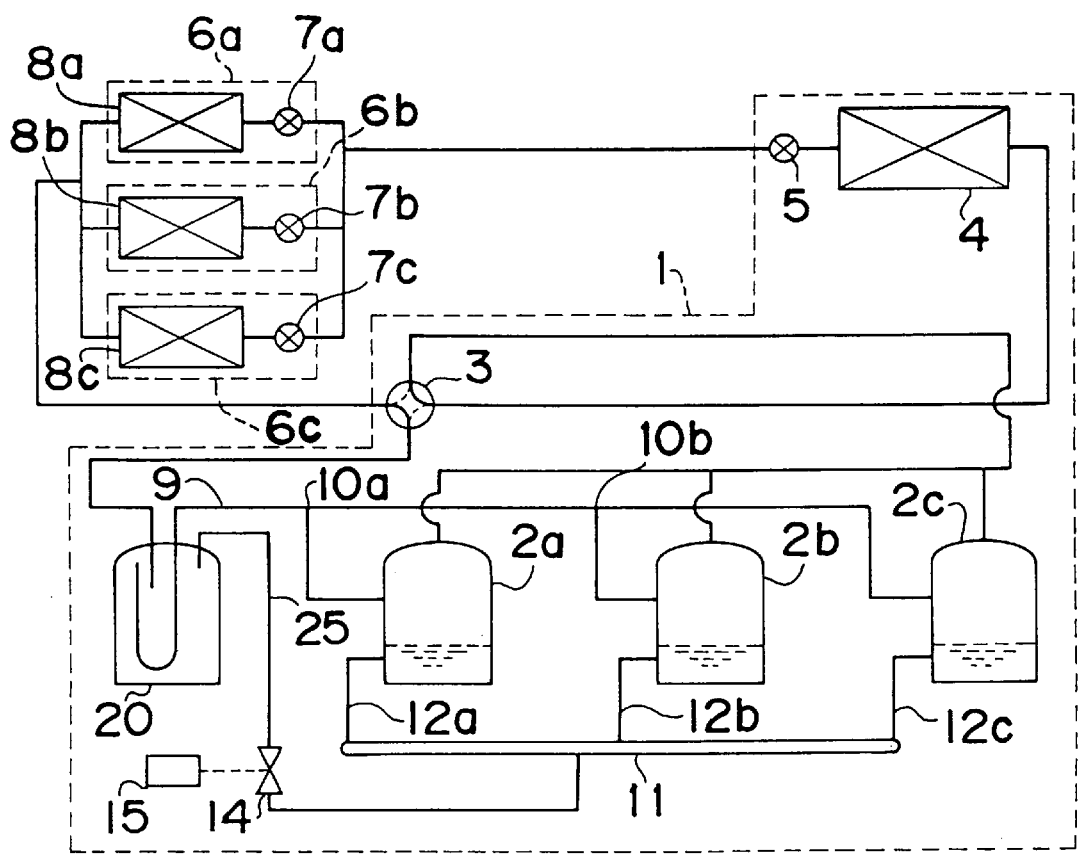
FIG. 13 is a diagram similar to FIG. 1, but according to an eighth embodiment of the present invention.
Figure 14:
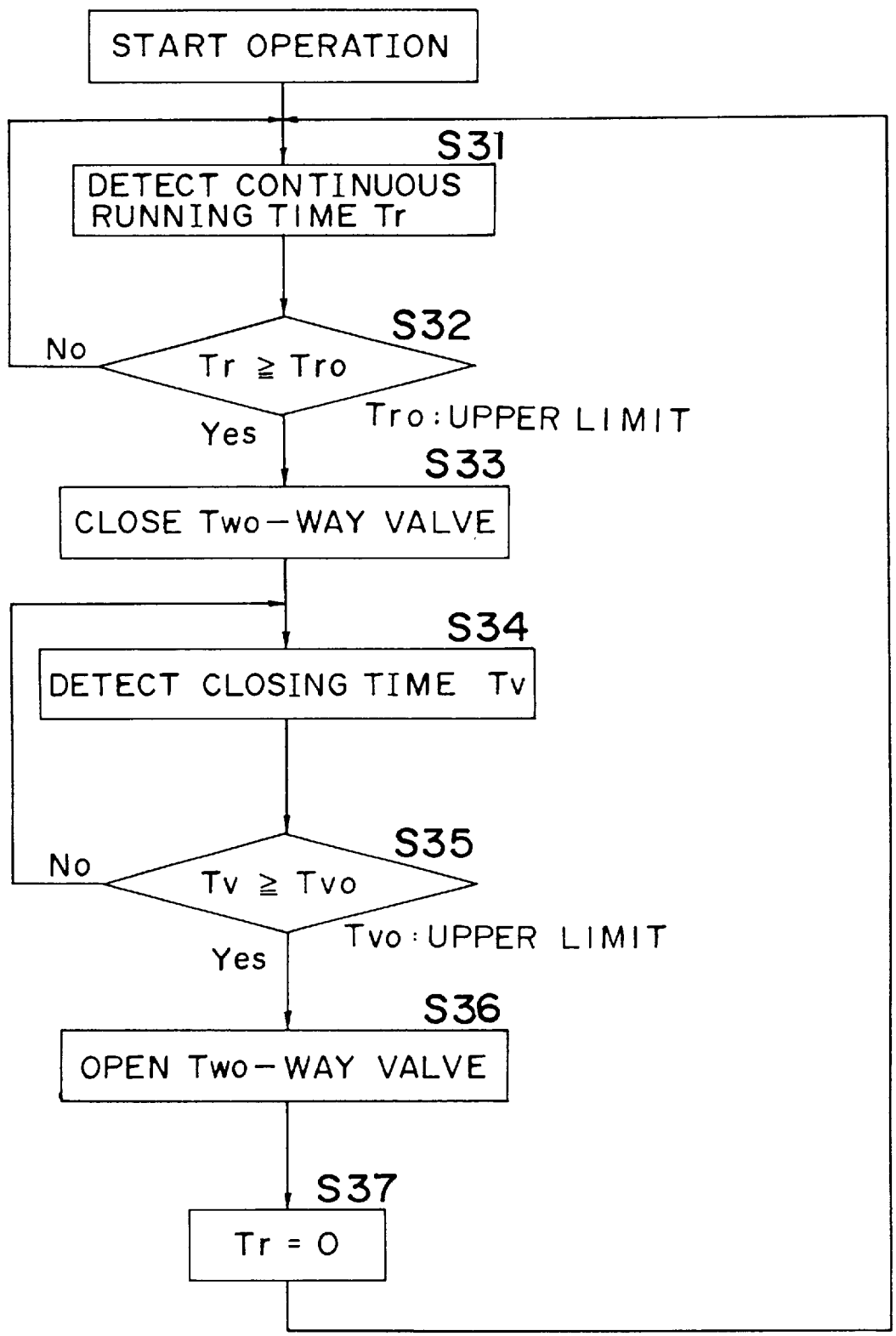
FIG. 14 is a flow-chart showing a method of controlling a two-way valve mounted in the oil level equalizing system according to the eighth embodiment of the present invention.

FIG. 13 is a view showing a refrigerating cycle of an air conditioning equipment employing the oil level equalizing system according to the eighth embodiment of the present invention. FIG. 14 is a flow-chart showing a method of controlling a two-way valve mounted in the oil level equalizing system.

In FIG. 13, an outdoor unit 1 of the air conditioning equipment comprises a plurality of low-pressure shell-type compressors 2a, 2b, 2c, a four-way valve 3 for switching the flowing direction of refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the suction side of the compressors 2a, 2b, 2c, and reference numerals 10a, 10b and 10c designate branch portions of the suction line 9.

An oil level equalizing line connecting line 12a, 12b, 12c is connected at its one end to each compressor 2a, 2b, 2c at a location adjacent to the normal oil level within its shell with its other end communicating with an oil level equalizing line 11. Reference numeral 20 designates an accumulator arranged in the suction line 9 on the upstream side of the suction line branch portion 10a, 10b for each compressor 2a, 2b, 2c. Reference numeral 25 designates a communication line for communicating the upper gas refrigerant portion within the accumulator 20 with the oil level equalizing line 11. Reference numeral 14 designates a two-way valve arranged in a midway portion of the communication line 25. When the two-way valve 14 is opened, the pressure within the oil level equalizing line 11 is higher than the pressures within the shells of the respective compressors 2a, 2b, 2c. Reference numeral 15 designates a two-way valve control means for closing the two-way valve 14 only for a certain period of time Tvo when the continuous running time Tr for the cooling or the heating has reached a predetermined time Tro.

The oil level equalizing system according to the eighth embodiment of the present invention comprises the plurality of low-pressure shell-type compressors 2a, 2b, 2c, the oil level equalizing line connecting lines 12a, 12b, 12c arranged for the respective compressors 2a, 2b, 2c and each having one end communicating with the shell of the corresponding compressor 2a, 2b or 2c at a location adjacent to the normal oil level within the shell, the oil level equalizing —line 11 communicating with the other ends of the respective connecting lines 12a, 12b, 12c, the accumulator 20 arranged in the suction line 9 on the upstream side of the suction line branch portion 10a, 10b for each compressor 2a, 2b, 2c, the communication line 25 for communicating the upper gas refrigerant portion within the accumulator 20 with the oil level equalizing line 11, the two-way valve 14 arranged in a midway portion of the communication line 25 so as to increase the pressure within the oil level equalizing line 11 to a value higher than the pressures within the shells of the respective compressors 2a, 2b, 2c during the valve opening, and the two-way valve control means 15 for closing the two-way valve 14 only for a predetermined time Tvo when the continuous running time Tr for cooling or the heating has reached a predetermined time Tro.

The operation of the two-way valve control means 19 will be explained with reference to the flow-chart of FIG. 14.

At step S31, the continuous running time Tr for cooling or the heating is detected. At step S32, if the continuous running time Tr detected at step S31 is less than a predetermined upper limit continuous running time Tro, the procedure returns to step S31. If it is equal to or more than the predetermined upper limit continuous running time Tro, the procedure advances to step S33, at which the two-way valve 14 is closed. At step S34, a closing time Tv of the two-way valve 14 is detected. At step S35, if the two-way valve closing time Tv detected at step S34 is less than the predetermined upper limit two-way valve closing time Tvo, the procedure returns to step S34. In contrast, if it is equal to or more than the predetermined upper limit two-way valve closing time Tvo, the procedure advances to step S36, at which the two-way valve 14 is opened. At step S37, the continuous running time Tr is returned to zero, and step S31 is resumed.

Next, a method of adequately regulating the oil quantity in each compressor 2a, 2b, 2c will be explained hereinafter.

It is first assumed that the plurality of compressors 2a, 2b, 2c include one or more compressors of different capacities or variable capacities and that the compressor 2a has a smaller capacity than those of the compressors 2b, 2c.

When the operations of all the compressors 2a, 2b, 2c are started, since the two-way valve 14 has been opened, the pressure within the oil level equalizing line 11 communicating with the upper gas refrigerant portion within the accumulator 20 through the communication line 25 is increased higher than the pressures within the shells of the compressors 2a, 2b, 2c. Therefore, the oil flowing out from the low-capacity compressor 2a to the connecting line 12a is blocked, so that oil level differentials do not occur which might be caused by the oil transfer due to internal pressure differentials between the shells of the respective compressors 2a, 2b, 2c.

The inlet of the communication line 25 is located at the upper portion within the accumulator 20 within which only the gas refrigerant from which the oil has been separated exists, only the gas refrigerant not containing any oil flows through the communication line 25.

When the continuous running time Tr for the cooling or the heating reaches the predetermined time Tro, the two-way valve 14 is closed so that the oil transfers through the oil level equalizing line 11 from the low-capacity compressor 2a having a high pressure within its shell into the high-capacity compressors 2b, 2c having a low pressure within their shells. Then, when the predetermined time Tvo passes after the two-way valve 14 has closed, the two-way valve 14 is opened to prevent the oil from transferring through the oil level equalizing line 11.

As described above, even if one or more compressors having different capacities or variable capacities are included among the plurality of compressors 2a, 2b, 2c, no oil transfers from the low-capacity compressor 2a to the high-capacity compressors 2b, 2c through the equalizing line 11 when the two-way valve 14 is opened during the operation of the compressors 2a, 2b, 2c. Accordingly, it becomes possible to prevent oil shortage within the low-capacity compressor 2a, which oil shortage would be caused by the oil transfer to the high-capacity compressors 2b, 2c through the equalizing line 11.

In general, since the oil quantity supplied to the compression chamber in the high-capacity compressors 2b, 2c is more than that in the low-capacity compressor 2a, the oil content of the delivered refrigerant is larger than that of the low-capacity compressor 2a. However, since the delivered refrigerants from the respective compressors 2a, 2b, 2c are joined after the delivery, the oil contents within the refrigerants drawn into the respective compressors 2a, 2b, 2c after being divided at the suction line branch portions 10a, 10b are equal to one another. Therefore, since the return oil quantity is less than the delivery oil quantity in each high-capacity compressor 2b, 2c, when the non-stop operation is continued for a long period of time, the oil quantity gradually decreases and oil shortage occurs before long.

However, when the continuous running time Tr reaches the predetermined time Tro, the two-way valve 14 is closed only for the predetermined time Tvo so that the oil transfers from the low-capacity compressor 2a to the high-capacity compressors 2b, 2c through the oil level equalizing line 11 while the compressors 2a, 2b, 2c are running and the two-way valve 14 is opened. Accordingly, it becomes possible to prevent oil shortage, which would be caused when the return oil quantity is less than the oil delivery quantity in the high-capacity compressors 2b, 2c, after the long time continuous operation. In this way, it becomes possible to maintain the adequate oil quantity in each compressor 2a, 2b, 2c.

Since the gas refrigerant separated by the accumulator 20 is introduced into the oil level equalizing line 11, there is little oil in this gas refrigerant and thus the non-stop operation can be extended.

An oil level equalizing system for plural compressors according to a ninth embodiment of the present invention will be explained hereinafter.

Figure 15:
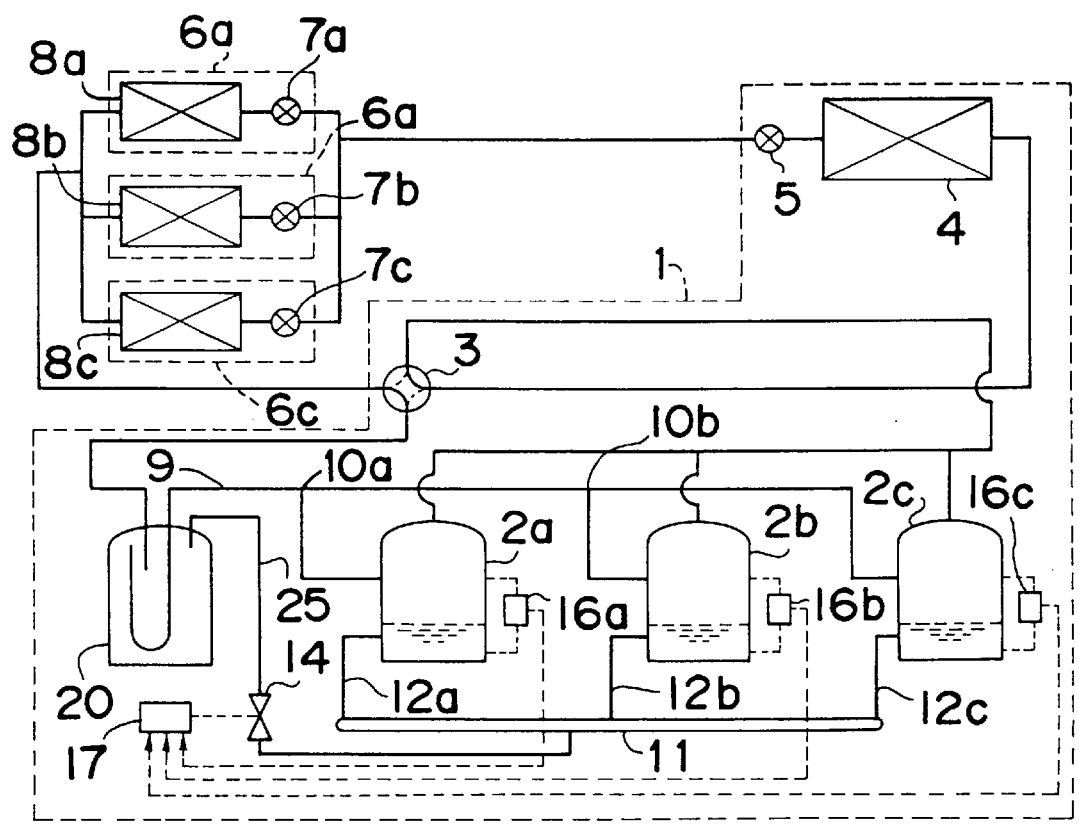
FIG. 15 is a diagram similar to FIG. 1, but according to a ninth embodiment of the present invention.
Figure 16:
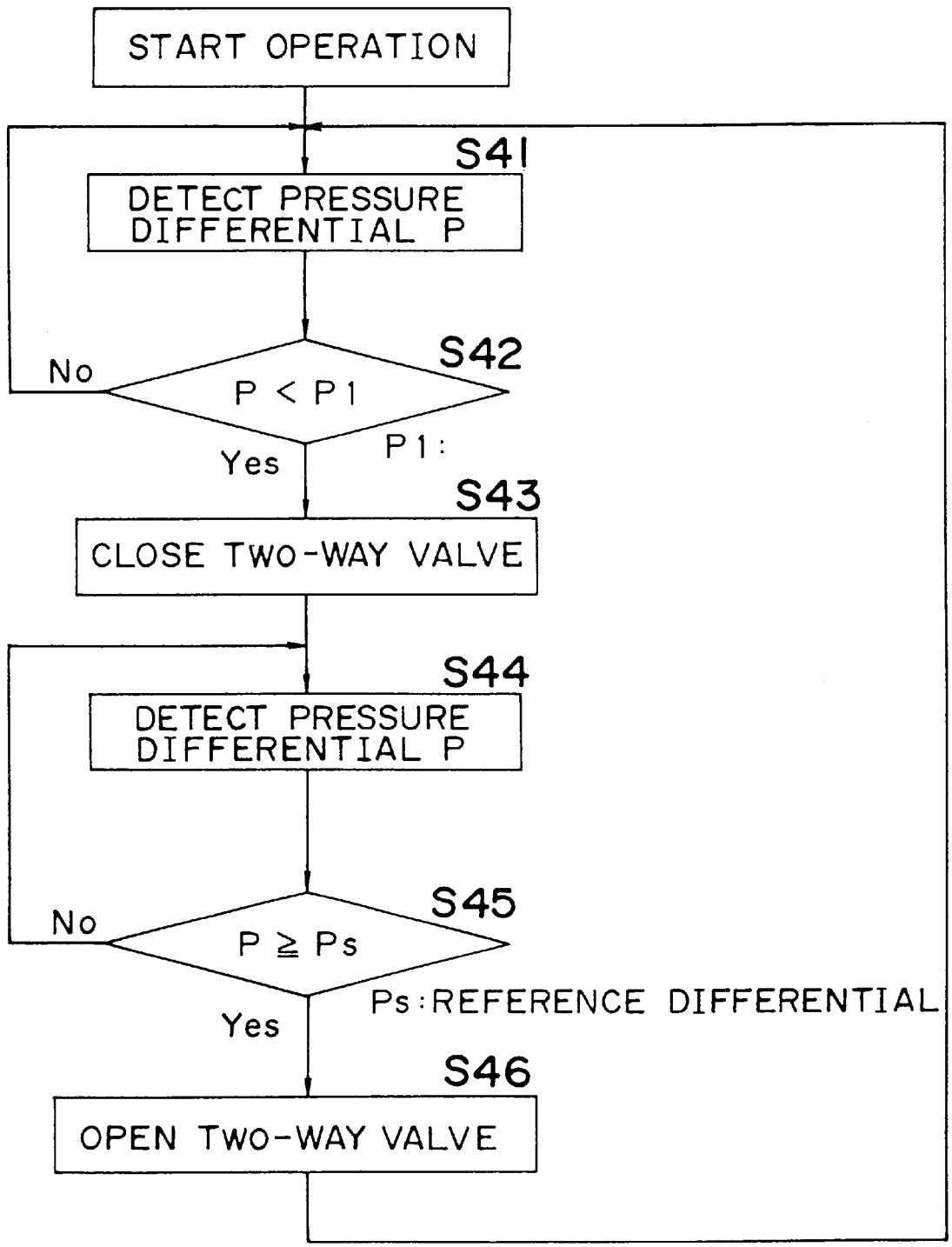
FIG. 16 is a flow-chart showing a method of controlling a two-way valve mounted in the oil level equalizing system according to the ninth embodiment of the present invention.

FIG. 15 is a view showing a refrigerating cycle of an air conditioning equipment employing the oil level equalizing system according to the ninth embodiment of the present invention, while FIG. 16 is a flow-chart showing a method of controlling a two-way valve mounted in the oil level equalizing system.

In FIG. 15, an outdoor unit 1 of the air conditioning equipment comprises a plurality of low-pressure shell-type compressors 2a, 2b, 2c, a four-way valve 3 for switching the flowing direction of refrigerant in accordance with a cooling operation and a heating operation, an outdoor heat exchanger 4 which serves as a condenser during the cooling operation and as an evaporator during the heating operation, and an outdoor expansion valve 5 which does not reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the suction side of the compressors 2a, 2b, 2c, and reference numerals 10a, 10b and 10c designate branch portions of the suction line 9.

An oil level equalizing line connecting line 12a, 12b, 12c is connected at its one end to each compressor 2a, 2b, 2c at a location adjacent to the normal oil level within its shell with its other end communicating with an oil level equalizing line 11. Reference numeral 20 designates an accumulator arranged in the suction line 9 on the upstream side relative to the suction line branch portion 10a, 10b for each compressor 2a, 2b, 2c. Reference numeral 25 designates a communication line for communicating the upper gas refrigerant portion within the accumulator 20 with the oil level equalizing line 11. Reference numeral 14 designates a two-way valve arranged in a midway portion of the communication line 25. When the two-way valve 14 is opened, the pressure within the oil level equalizing line 11 is higher than the pressures within the shells of the respective compressors 2a, 2b, 2c. Reference numerals 16a, 16b, 16c designate pressure differential detecting units (for example, pressure differential sensors or two pressure sensors) for detecting the pressure differentials between the shell upper portions and the shell lower portions of the compressors 2a, 2b, 2c. Reference numeral 17 designates a two-way valve control means for closing the two-way valve 14 when the pressure differential P between the shell upper portion and the shell lower portion detected by at least one of the pressure differential detecting units 16a, 16b, 16c becomes smaller than a predetermined lower limit pressure differential P1 and for subsequently opening the two-way valve 14 when the pressure differentials P between the shell upper portions and the shell lower portions detected by the pressure differential detecting units 16a, 16b, 16c of all the compressors 2a, 2b, 2c become equal to or larger than a predetermined reference pressure differential Ps.

The oil level equalizing system according to the ninth embodiment of the present invention comprises the plurality of low-pressure shell-type compressors 2a, 2b, 2c, the oil level equalizing line connecting lines 12a, 12b, 12c arranged for the respective compressors 2a, 2b, 2c and each having one end communicating with the shell of the corresponding compressor 2a, 2b or 2c at a location adjacent to the normal oil level within the shell, the oil level equalizing line 11 communicating with the other ends of the respective connecting lines 12a, 12b, 12c, the accumulator 20 arranged in the suction line 9 on the upstream side relative to the suction line branch portion 10a, 10b for each compressor 2a, 2b, 2c, the communication line 25 for communicating the upper gas refrigerant portion within the accumulator 20 with the oil level equalizing line 11, the two-way valve 14 arranged in the midway portion of the communication line 25 to increase the pressure within the oil level equalizing line 11 to a value higher than those within the shells of the respective compressors 2a, 2b, 2c during the valve opening, the pressure differential detecting units 16a, 16b, 16c for detecting the pressure differentials between the shell upper portions and the shell lower portions of the compressors 2a, 2b, 2c, and the two-way valve control means 17 for closing the two-way valve 14 when the pressure differential P between the shell upper portion and the shell lower portion detected by at least one of the pressure differential detecting units 16a, 16b, 16c becomes smaller than the predetermined lower limit pressure differential P1 and for subsequently opening the two-way valve 14 when the pressure differentials P between the shell upper portions and the shell lower portions then detected by the pressure differential detecting units 16a, 16b, 16c of all the compressors 2a, 2b, 2c become equal to or larger than the predetermined reference pressure differential Ps.

Next, the operation of the two-way valve control means 19 will be explained with reference to the flow-chart of FIG. 16.

First, at step S41, the pressure differential detecting units 16a, 16b, 16c detect the pressure differentials P between the shell upper portions and the shell lower portions of the compressors 2a, 2b, 2c. At step S42, if the pressure differential P detected at step S41 for at least one of the compressors 2a, 2b, 2c is equal to or larger than the predetermined lower limit pressure differential P1, step S41 is resumed. In contrast, if it is smaller than the predetermined lower limit pressure differential P1, the procedure advances to step S43, at which the two-way valve 14 is closed. At step S44, the pressure differential detecting units 16a, 16b, 16c detect the pressure differentials P between the shell upper portions and the shell lower portions of the compressors 2a, 2b, 2c. At step S45, if the pressure differential P detected at step S44 for all the compressors 2a, 2b, 2c is smaller than the predetermined reference pressure differential Ps, step S44 is resumed. If it is equal to or larger than the predetermined reference pressure differential Ps, the procedure advances to step S46, at which the two-way valve 14 is opened, and the procedure returns to step S41.

Next, a method of adequately regulating the oil quantity in each compressor 2a, 2b, 2c will be explained hereinafter.

It is first assumed that the plurality of compressors 2a, 2b, 2c include one or more compressors of different capacities or variable capacities and that the compressor 2a has a smaller capacity than those of the compressors 2b, 2c.

When the operations of all the compressors 2a, 2b, 2c are started, since the two-way valve 14 has been opened, the pressure within the oil level equalizing line 11 communicating with the upper gas refrigerant portion within the accumulator 20 through the communication line 25 is increased higher than the pressures within the shells of the compressors 2a, 2b, 2c. Therefore, the oil flowing out from the low-capacity compressor 2a to the connecting line 12a is blocked, so that oil level differentials do not occur which might be caused by the oil transfer due to internal pressure differentials between the shells of the respective compressors 2a, 2b, 2c.

The inlet of the communication line 25 is located in the upper portion within the accumulator 20 within which only the gas refrigerant from which the oil has been separated exists, only the gas refrigerant containing no oil flows through the communication line 25.

When the oil quantities of the compressors 2a, 2b, 2c decrease, the oil levels lower and thus the pressure differentials P between the shell upper portions and the shell lower portions thereof become smaller. In contrast, when the oil quantities of the compressors 2a, 2b, 2c increase, the oil levels rise and thus the pressure differentials P between the shell upper portions and the shell lower portions become larger.

Accordingly, when the oil quantities of the compressors 2b, 2c decrease and thus the pressure differentials P between the shell upper portions and the shell lower portions thereof become smaller than the lower limit pressure differential P1, the two-way valve is closed so that the oil transfers through the oil level equalizing line 11 from the low-capacity compressor 2a having a higher pressure within its shell to the high-capacity compressors 2b, 2c having lower pressures within their shells. Then, when the oil quantities of the compressors 2b, 2c increase and thus the pressure differential between the shell upper portions and the shell lower portions become equal to or larger than the reference pressure differential Ps, the two-way valve 14 is opened and the oil is prevented from transferring through the equalizing line 11.

As described above, even if one or some compressors having different capacities or variable capacities are included among the plurality of compressors 2a, 2b, 2c, no oil transfers from the low-capacity compressor 2a to the high-capacity compressors 2b, 2c through the oil level equalizing line 11 while the compressors 2a, 2b, 2c are running and the two-way valve 14 is opened. Accordingly, it becomes possible to prevent oil shortage within the low-capacity compressor 2a, which oil shortage would be caused by the oil transfer to the high-capacity compressors 2b, 2c through the equalizing line 11.

In general, since the oil quantity supplied to the compression chamber in the high-capacity compressors 2b, 2c is greater than that in the low-capacity compressor 2a, the oil content of the delivered refrigerant is greater than that of the high-capacity compressor 2a. However, since the refrigerants delivered from the respective compressors 2a, 2b, 2c are joined after the delivery, the oil contents within the refrigerants drawn into the respective compressors 2a, 2b, 2c after being divided at the suction line branch portions 10a, 10b are equal to one another. Therefore, since the return oil quantity is less than the delivery oil quantity in each high-capacity compressor 2b, 2c, when the non-stop operation is continued for a long period of time, the oil quantity gradually decreases and oil shortage occurs before long.

However, when the oil quantities of the high-capacity compressors 2b, 2c decrease so that the pressure differentials P between the shell upper portions and the shell lower portions thereof become smaller than the lower limit pressure differentials P1 between the shell upper portions and the shell lower portions thereof, the two-way valve 14 is closed until the oil quantities increase and the pressure differentials P between the shell upper portions and the shell lower portions thereof become equal to or larger than the reference pressure differential Ps, so that the oil transfers from the low-capacity compressor 2a to the high-capacity compressors 2b, 2c through the oil level equalizing line 11. Therefore, it becomes possible to prevent oil shortage, which would be caused when the return oil quantity is less than the delivery oil quantity in the high-capacity compressors 2b, 2c, after the long time non-stop running.

Further, since the oil shortages in the respective compressors 2a, 2b, 2c are detected by the pressure differentials P between the shell upper portions and the shell lower portions thereof, the two-way valve 14 can be controlled accurately without being affected by variations in the oil delivery quantity and the oil return quantity of the compressors 2a, 2b, 2c which may be caused under different operation conditions. Accordingly, it becomes possible to prevent oil shortage in the high-capacity compressors 2b, 2c which would be caused by delayed closing of the two-way valve 14 or early opening of the two-way valve 14 after the closing, and also to prevent oil shortage in the low-capacity compressor 2a which would be caused by delayed or early opening of the two-way valve 14 after the closing. In this way, it is possible to maintain the adequate oil quantities in the respective compressors 2a, 2b, 2c.

Since the gas refrigerant separated by the accumulator 20 is introduced into the oil level equalizing line 11, there is little oil in this gas refrigerant and thus the non-stop operation can be extended.

An oil level equalizing system for plural compressors according to a tenth embodiment of the present invention will be explained hereinafter.

Figure 17:
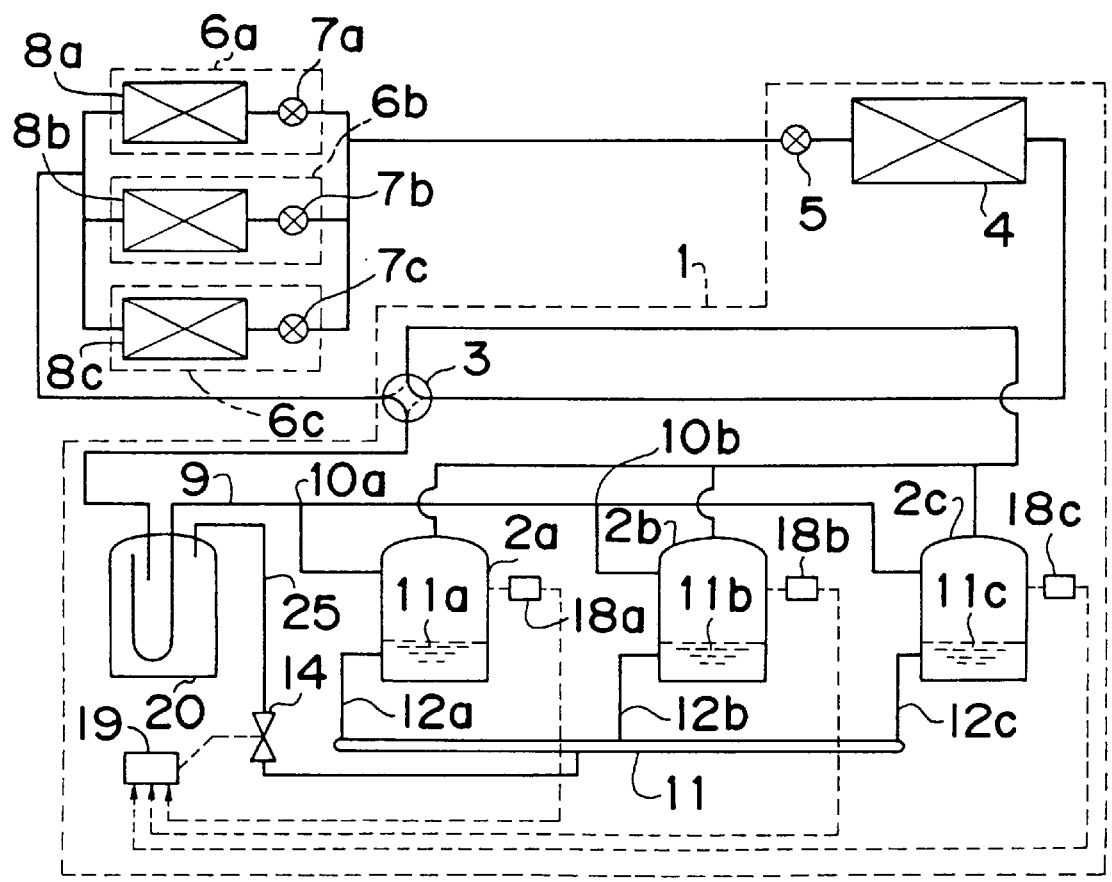
FIG. 17 is a diagram similar to FIG. 1, but according to a tenth embodiment of the present invention.
Figure 18:
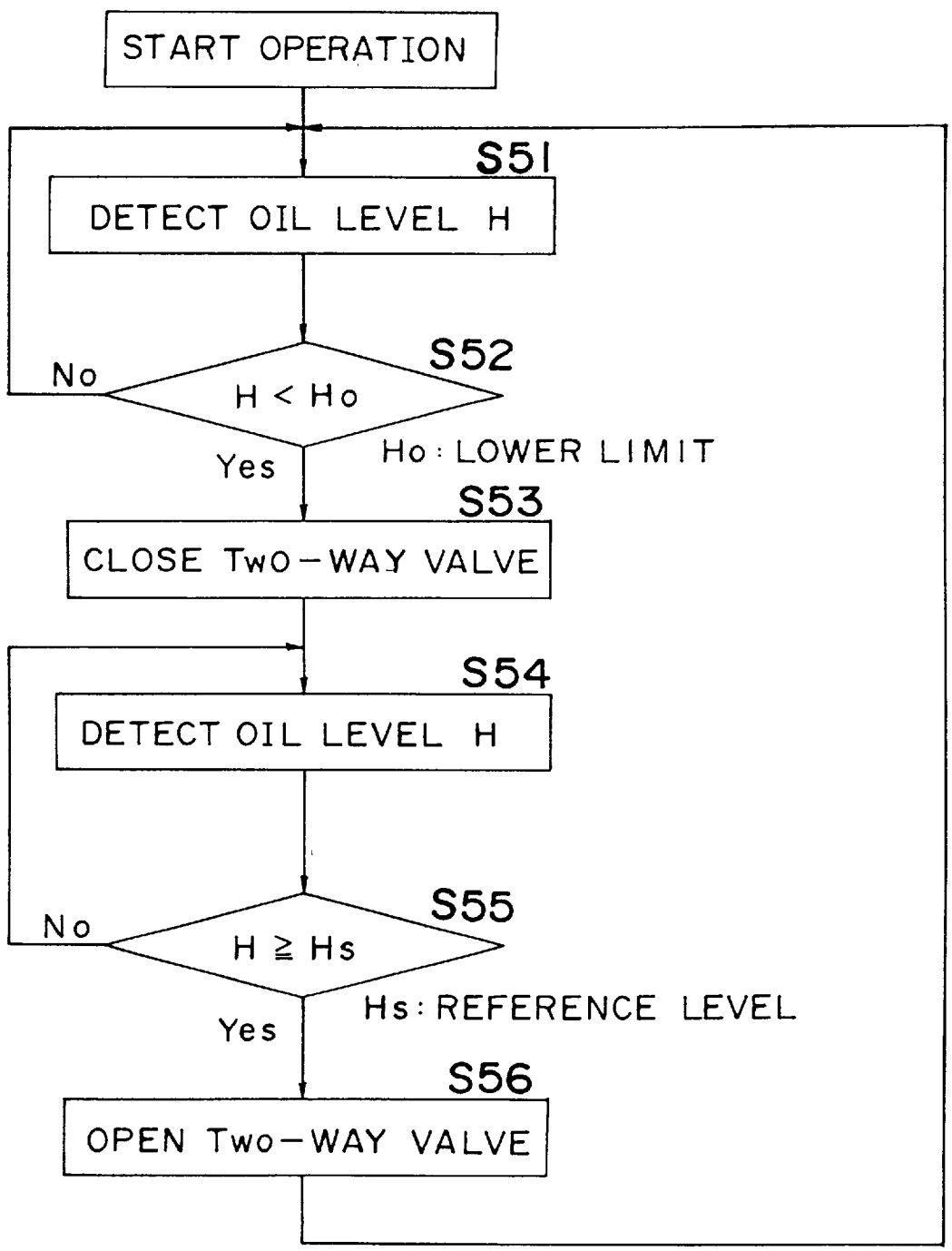
FIG. 18 is a flow-chart showing a method of controlling a two-way valve mounted in the oil level equalizing system according to the tenth embodiment of the present invention.
Figure 19:
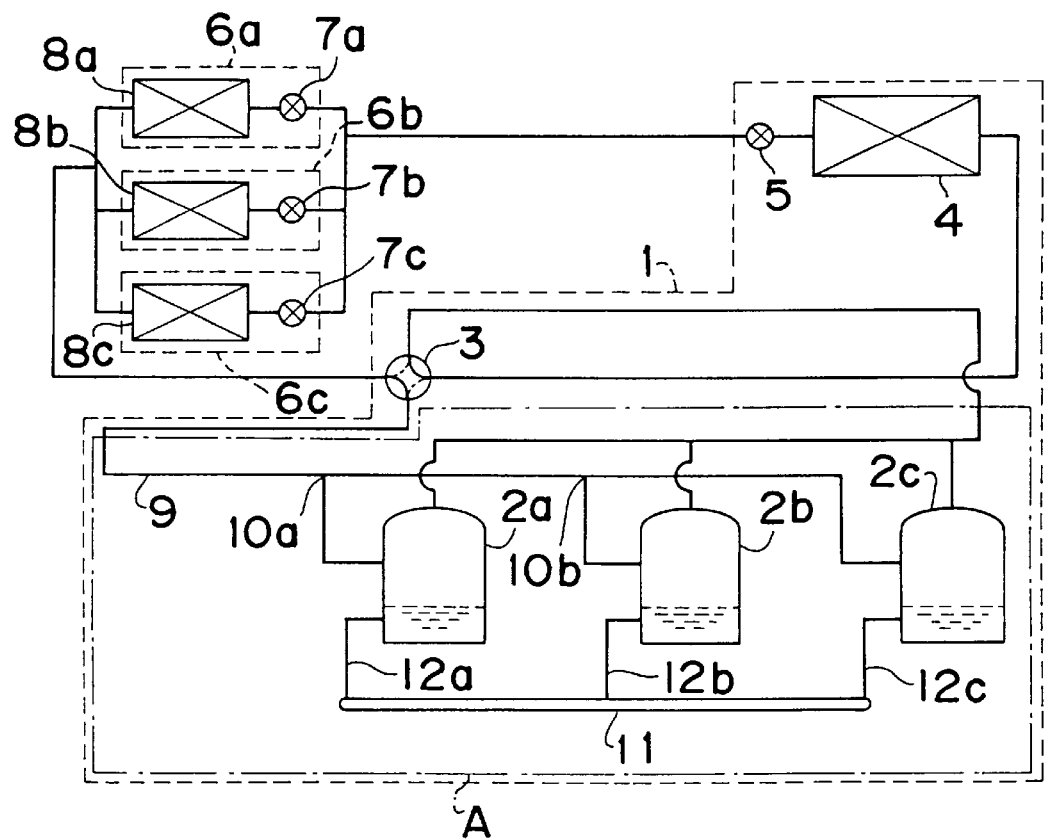
FIG. 19 is a diagram of a refrigerating cycle of an air conditioning equipment employing a conventional oil level equalizing system for plural compressors.
Figure 20:
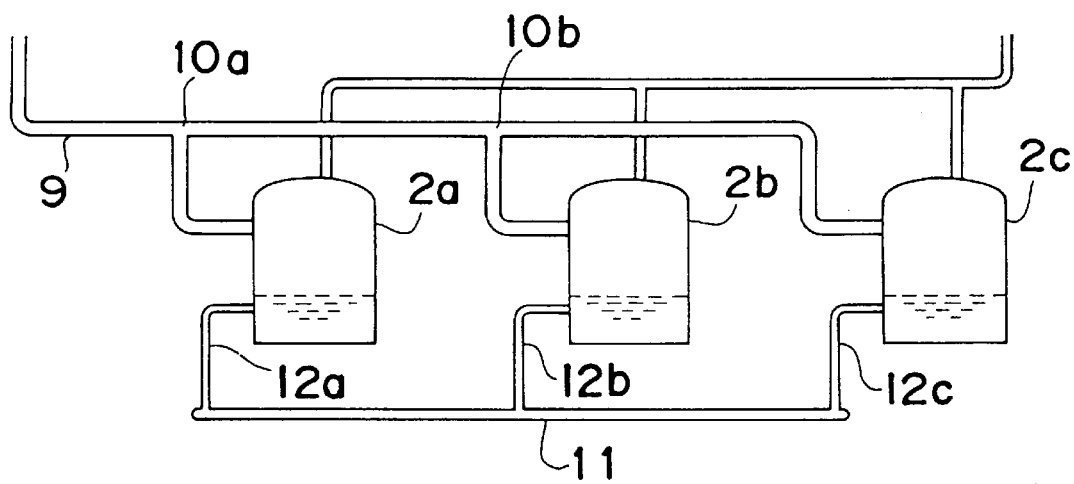
FIG. 20 is a detailed view of a portion denoted by A in FIG. 19.

FIG. 17 is a view showing a refrigerating cycle of an air conditioning equipment employing the oil level equalizing system according to the tenth embodiment of the present invention, while FIG. 18 is a flow-chart showing a method of controlling a two-way valve mounted in the oil level equalizing system.

In FIG. 17, an outdoor unit 1 of the air conditioning equipment comprises a plurality of low-pressure shell-type compressors 2a, 2b, 2c, a four-way valve 3 for switching the flowing direction of refrigerant in accordance with a cooling operation and a heating operation, an outdoor heat exchanger 4 which serves as a condenser during the cooling operation and as an evaporator during the heating operation, and an outdoor expansion valve 5 which does not -reduce the pressure during the cooling operation but serves as a pressure reduction unit during the heating operation. Each of indoor units 6a, 6b, 6c comprises an indoor expansion valve 7a, 7b or 7c which does not reduce the pressure during the heating operation but serves as a pressure reduction unit during the cooling operation, and an indoor heat exchanger 8a, 8b or 8c which serves as an evaporator during the cooling operation and as a condenser during the heating operation. Further, the outdoor unit 1 is connected to the indoor units 6a, 6b, 6c to thereby constitute a looped refrigerant circuit.

Reference numeral 9 designates a suction line which communicates with the suction side of the compressors 2a, 2b, 2c, and reference numerals 10a, 10b and 10c designate branch portions of the suction line 9.

An oil level equalizing line connecting line 12a, 12b, 12c is connected at its one end to each compressor 2a, 2b, 2c at a location adjacent to the normal oil level within its shell with its other end communicating with an oil level equalizing line 11. Reference numeral 20 designates an accumulator arranged in the suction line 9 on the upstream side relative to the suction line branch portion 10a, 10b for each compressor 2a, 2b, 2c. Reference numeral 25 designates a communication line for communicating the upper gas refrigerant portion within the accumulator 20 with the oil level equalizing line 11. Reference numeral 14 designates a two-way valve arranged in a midway portion of the communication line 25. While the two-way valve 14 is open, the pressure within the oil level equalizing line 11 is higher than those within the shells of the respective compressors 2a, 2b, 2c. Reference numerals 18a, 18b, 18c designate oil level detecting units (for example, a plurality of float switches) for detecting oil levels H in the compressors 2a, 2b, 2c. Reference numeral 19 designates a two-way valve control means for closing the two-way valve 14 when the oil level H detected by at least one of the oil level detecting units 16a, 16b, 16c becomes lower than a predetermined lower limit oil level Ho and for subsequently opening the two-way valve 14 when the oil levels H detected by the oil level detecting units 16a, 16b, 16c of all the compressors 2a, 2b, 2c become equal to or higher than a predetermined reference oil level Hs.

The oil level equalizing system for plural compressors according to the tenth embodiment of the present invention comprises the plurality of low-pressure shell-type compressors 2a, 2b, 2c, the oil level equalizing line connecting lines 12a, 12b, 12c arranged for the respective compressors 2a, 2b, 2c and each having one end communicating with the shell of the corresponding compressor 2a, 2b or 2c at a location adjacent to the normal oil level within the shell, the oil level equalizing line 11 communicating with the other ends of the respective connecting lines 12a, 12b, 12c, the accumulator 20 arranged in the suction line 9 on the upstream side relative to the suction line branch portion 10a, 10b for each compressor 2a, 2b, 2c, the communication line 25 for communicating the upper gas refrigerant portion within the accumulator 20 with the oil level equalizing line 11, the two-way valve 14 arranged in a midway portion of the communication line 25 so as to increase the pressure within the oil level equalizing line 11 to a value higher than those within the shells of the respective compressors 2a, 2b, 2c during the opening thereof, the oil level detecting units 18a, 18b, 18c for detecting the oil levels H in the compressors 2a, 2b, 2c, and the two-way valve control means 19 for closing the two-way valve 14 when the oil level H detected by at least one of the oil level detecting unit 18a, 18b or 18c becomes lower than the predetermined lower limit oil level Ho and for subsequently opening the two-way valve 14 when the oil levels H detected by the oil level detecting units 18a, 18b, 18c of all the compressors 2a, 2b, 2c become equal to or higher than the predetermined reference oil level Hs.

Next, the operation of the two-way valve control means 19 will be explained with reference to the flow-chart of FIG. 18.

At step S51, the oil levels H in the compressors 2a, 2b, 2c are detected by the oil level detecting units 18a, 18b, 18c, respectively. At step S52, if the oil level H detected at step S51 for at least one of the compressors 2a, 2b, 2c is equal to or higher than the predetermined lower limit oil level Ho, step S51 is resumed. In contrast, if it is lower than the predetermined lower limit oil level Ho, the procedure advances to step S53, at which the two-way valve 14 is closed. At step S54, the oil levels H in the compressors 2a, 2b, 2c are detected by the oil level detecting units 18a, 18b, 18c, respectively. At step S55, if the oil levels H for all the compressors 2a, 2b, 2c are lower than the predetermined reference oil level Hs, step S54 is resumed. If it is equal to or higher than the predetermined reference oil level Hs, the procedure advances to step S56, at which the two-way valve 14 is opened, and the procedure returns to step S51.

A method of adequately regulating the oil quantity in each compressor 2a, 2b, 2c will be explained hereinafter.

It is first assumed that the plurality of compressors 2a, 2b, 2c include one or more compressors of different capacities or variable capacities and that the compressor 2a has a smaller capacity than those of the compressors 2b, 2c.

When the operations of all the compressors 2a, 2b, 2c are started, since the two-way valve 14 has been opened, the pressure within the oil level equalizing line 11 communicating with the upper gas refrigerant portion within the accumulator 20 through the communication line 25 is increased higher than the pressures within the shells of the compressors 2a, 2b, 2c. Therefore, the oil flowing out from the low-capacity compressor 2a to the connecting line 12a is blocked, so that oil level differentials do not occur which might be caused by the oil transfer due to internal pressure differentials between the shells of the respective compressors 2a, 2b, 2c.

The inlet of the communication line 25 is located at the upper portion within the accumulator 20 within which only the gas refrigerant from which the oil has been separated exists, only the gas refrigerant containing no oil flows through the communication line 25.

When the oil quantities of the compressors 2b, 2c decrease and the oil levels H thereof become lower than the lower limit oil level Ho, the two-way valve 14 is closed and the oil transfers through the oil level equalizing line 11 from the low-capacity compressor 2a having the higher pressure within its shell into the high-capacity compressors 2b, 2c having the lower pressures within their shells. Then, when the oil quantities of the compressor 2b, 2c increase and the oil levels H thereof become equal to or higher than the reference oil level Hs, the two-way valve 14 is opened and the oil transfer through the equalizing line 11 is stopped.

As described above, even if one or more compressors having different capacities or variable capacities are included among the plurality of compressors 2a, 2b, 2c, no oil transfers from the low-capacity compressor 2a to the high-capacity compressors 2b, 2c through the oil level equalizing line 11 while the compressors 2a, 2b, 2c are running and the two-way valve 14 is opened. Accordingly, it becomes possible to prevent oil shortage within the low-capacity compressor 2a which oil shortage would be caused by the oil transfer to the high-capacity compressors 2b, 2c through the equalizing line 11.

In general, since the oil quantity supplied to the compression chamber in the high-capacity compressors 2b, 2c is greater than that in the low-capacity compressor 2a, the oil content within the delivered refrigerant therein is larger than that in the low-capacity compressor 2a. However, since the delivered refrigerants from the respective compressors 2a, 2b, 2c are joined after the delivery, the oil contents within the refrigerants drawn into the respective compressors 2a, 2b, 2c after being divided at the suction line branch portions 10a, 10b are equal to one another. Therefore, since the return oil quantity is less than the delivery oil quantity in each high-capacity compressor 2b, 2c, when the non-stop operation is continued for a long period of time, the oil quantity gradually decreases and oil shortage occurs before long.

However, when the oil quantities in the high-capacity compressors 2b, 2c decrease so that the oil levels H thereof become lower than the lower limit oil levels Ho thereof, the two-way valve 14 is closed until the oil quantities increase and the oil levels H thereof become equal to or higher than the reference oil level Hs, so that the oil transfers from the low-capacity compressor 2a to the high-capacity compressors 2b, 2c through the oil level equalizing line 11. Therefore, it becomes possible to prevent oil shortage, which would be caused when the return oil quantity is less than the delivery oil quantity in the high-capacity compressors 2b, 2c, after the long time non-stop running.

Further, since the oil shortages in the respective compressors 2a, 2b, 2c are detected by the oil levels thereof, the two-way valve 14 can be controlled accurately without being affected by variations in the oil delivery quantity and the oil return quantity of the compressors 2a, 2b, 2c which may be caused under different operating conditions. Accordingly, it becomes possible to prevent oil shortage in the high-capacity compressors 2b, 2c which would be caused by delayed closing of the two-way valve 14 or early opening of the two-way valve 14 after the closing and also to prevent oil shortage in the low-capacity compressor 2a which would be caused by early or delayed opening of the two-way valve 14 after the closing. In this way, it is possible to maintain the adequate oil quantities in the respective compressors 2a, 2b, 2c.

Since the gas refrigerant separated by the accumulator 20 is introduced into the oil level equalizing line 11, there is little oil in this gas refrigerant and thus the non-stop operation can be extended.

It is to be noted here that although, in the first to tenth embodiments referred to above, the oil level equalizing system has been described as comprising three compressors 2a, 2b, 2c, the present invention is not limited to such cases, but can be applied to the cases employing at least two compressors.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An oil level equalizing system comprising:
   a suction line having a plurality of branch portions branched therefrom;
   a plurality of compressors each communicating with one of said plurality of branch portions and each having a low-pressure shell;
   a plurality of connecting lines each having a first end communicating with said shell at a location adjacent to a normal oil level therein;
   an oil level equalizing line communicating with second ends of said plurality of connecting lines; and
   a communication line, through which said suction line communicates with said oil level equalizing line at a location upstream of said plurality of branch portions with respect to a direction of flow of a refrigerant, for increasing a pressure within said oil level equalizing line to a value higher than that within said shell of each of said plurality of compressors by introducing a portion of the refrigerant accommodated in said suction line to said oil level equalizing line when at least one of said plurality of compressors is in operation.

2. The oil level equalizing system according to claim 1, further comprising a two-way valve arranged in a midway portion of said communication line for increasing, when opened, a pressure within said oil level equalizing line to said value, and a two-way valve control means for closing said two-way valve for a predetermined period of time when a continuous running time for cooling or heating reaches a predetermined time.

3. The oil level equalizing system according to claim 1, further comprising a two-way valve arranged in a midway portion of said communication line for increasing, when opened, a pressure within said oil level equalizing line to said value, a plurality of pressure differential detecting units each for detecting a pressure differential between a shell upper portion and a shell lower portion of a corresponding one of said plurality of compressors, and a two-way valve control means for closing said two-way valve when the pressure differential detected by at least one of said plurality of pressure differential detecting units becomes smaller than a predetermined lower limit, and for subsequently opening said two-way valve when the pressure differentials detected by all said pressure differential detecting units become equal to or larger than a predetermined reference pressure differential.

4. The oil level equalizing system according to claim 1, further comprising a two-way valve arranged in a midway portion of said communication line for increasing, when opened, a pressure within said oil level equalizing line to said value, a plurality of oil level detecting units each for detecting an oil level in a corresponding one of said plurality of compressors, and a two-way valve control means for closing said two-way valve when the oil level detected by at least one of said plurality of oil level detecting units becomes lower than a predetermined lower limit, and for subsequently opening said two-way valve when the oil levels detected by all said oil level detecting units become equal to or higher than a predetermined reference oil level.

5. An oil level equalizing system comprising:
   a suction line having a plurality of branch portions branched therefrom;
   a plurality of compressors each communicating with one of said plurality of branch portions and each having a low-pressure shell;
   a plurality of connecting lines each having a first end communicating with said shell at a location adjacent to a normal oil level therein;

an oil level equalizing line communicating with second ends of said plurality of connecting lines;

an accumulator arranged in said suction line at a location upstream of said plurality of branch portions with respect to a direction of flow of a refrigerant; and a communication line, through which said oil level equalizing line communicates with an upper portion of said accumulator in which the gas refrigerant is accommodated, for increasing a pressure within said oil level equalizing line to a value higher than that within said shell of each of said plurality of compressors by introducing a portion of the gas refrigerant accommodated in the upper portion of said accumulator to said oil level equalizing line when at least one of said plurality of compressors is in operation.

6. The oil level equalizing system according to claim 5, further comprising a two-way valve arranged in a midway portion of said communication line for increasing, when opened, a pressure within said oil level equalizing line to said value, and a two-way valve control means for closing said two-way valve for a predetermined period of time when a continuous running time for cooling or heating reaches a predetermined time.

7. The oil level equalizing system according to claim 5, further comprising a two-way valve arranged in a midway portion of said communication line for increasing, when opened, a pressure within said oil level equalizing line to said value, a plurality of pressure differential detecting units each for detecting a pressure differential between a shell upper portion and a shell lower portion of a corresponding one of said plurality of compressors, and a two-way valve control means for closing said two-way valve when the pressure differential detected by at least one of said plurality of pressure differential detecting units becomes smaller than a predetermined lower limit, and for subsequently opening said two-way valve when the pressure differentials detected by all said pressure differential detecting units become equal to or larger than a predetermined reference pressure differential.

8. The oil level equalizing system according to claim 5, further comprising a two-way valve arranged in a midway portion of said communication line for increasing, when opened, a pressure within said oil level equalizing line to said value, a plurality of oil level detecting units each for detecting an oil level in a corresponding one of said plurality of compressors, and a two-way valve control means for closing said two-way valve when the oil level detected by at least one of said plurality of oil level detecting units becomes lower than a predetermined lower limit, and for subsequently opening said two-way valve when the oil levels detected by all said oil level detecting units become equal to or higher than a predetermined reference oil level.

9. An air conditioning equipment having an oil level equalizing system comprising:

a suction line having a plurality of branch portions branched therefrom;

a plurality of compressors each communicating with one of said plurality of branch portions and each having a low-pressure shell;

a plurality of connecting lines each having a first end communicating with said shell at a location adjacent to a normal oil level therein;

an oil level equalizing line communicating with second ends of said plurality of connecting lines; and a communication line, through which said suction line communicates with oil level equalizing line at a location upstream of said plurality of branch portions with respect to a direction of flow of a refrigerant, for increasing a pressure within said oil level equalizing line to a value higher than that within said shell of each of said plurality of compressors by introducing a portion of the refrigerant accommodated in said suction line to said oil level equalizing line when at least one of said plurality of compressors is in operation.

10. The air conditioning equipment according to claim 9, further comprising a two-way valve arranged in a midway portion of said communication line for increasing, when opened, a pressure within said oil level equalizing line to said value, and a two-way valve control means for closing said two-way valve for a predetermined period of time when a continuous running time for cooling or heating reaches a predetermined time.

11. The air conditioning equipment according to claim 9, further comprising a two-way valve arranged in a midway portion of said communication line for increasing, when opened, a pressure within said oil level equalizing line to said value, a plurality of pressure differential detecting units each for detecting a pressure differential between a shell upper portion and a shell lower portion of a corresponding one of said plurality of compressors, and a two-way valve control means for closing said two-way valve when the pressure differential detected by at least one of said plurality of pressure differential detecting units becomes smaller than a predetermined lower limit, and for subsequently opening said two-way valve when the pressure differentials detected by all said pressure differential detecting units become equal to or larger than a predetermined reference pressure differential.

12. The air conditioning equipment according to claim 9, further comprising a two-way valve arranged in a midway portion of said communication line for increasing, when opened, a pressure within said oil level equalizing line to said value, a plurality of oil level detecting units each for detecting an oil level in a cor responding one of said plurality of compressors, and a two-way valve control means for closing said two-way valve when the oil level detected by at least one of said plurality of oil level detecting units becomes lower than a predetermined lower limit, and for subsequently opening said two-way valve when the oil levels detect ed by all said oil level detecting units become equal to or higher than a predetermined reference oil level.

13. An air conditioning equipment having an oil level equalizing system comprising:

a suction line having a plurality of branch portions branched therefrom;

a plurality of compressors each communicating with one of said plurality of branch portions and each having a low-pressure shell;

a plurality of connecting lines each having a first end communicating with said shell at a location adjacent to a normal oil level therein;

an oil level equalizing line communicating with second ends of said plurality of connecting lines;

an accumulator arranged in said suction line at a location upstream of said plurality of branch portions with respect to a direction of flow of refrigerant; and a communication line, through which said oil level equalizing line communicates with an upper portion of said accumulator in which the gas refrigerant is accommodated, for increasing a pressure within said oil level equalizing line to a value higher than that within said shell of each of said plurality of compressors by introducing a portion of the gas refrigerant accommodated in the upper portion of said accumulator to said oil level equalizing line when at least one of said plurality of compressors is in operation.

14. The air conditioning equipment according to claim 13, further comprising a two-way valve arranged in a midway portion of said communication line for increasing, when opened, a pressure within said oil level equalizing line to said value, and a two-way valve control means for closing said two-way valve for a predetermined period of time when a continuous running time for cooling or heating reaches a predetermined time.

15. The air conditioning equipment according to claim 13, further comprising a two-way valve arranged in a midway portion of said communication line for increasing, when opened, a pressure within said oil level equalizing line to said value, a plurality of pressure differential detecting units each for detecting a pressure differential between a shell upper portion and a shell lower portion of a corresponding one of said plurality of compressors, and a two-way valve control means for closing said two-way valve when the pressure differential detected by at least one of said plurality of pressure differential detecting units becomes smaller than a predetermined lower limit, and for subsequently opening said two-way valve when the pressure differentials detected by all said pressure differential detecting units become equal to or larger than a predetermined reference pressure differential.

16. The air conditioning equipment according to claim 13, further comprising a two-way valve arranged in a midway portion of said communication line for increasing, when opened, a pressure within said oil level equalizing line to said value, a plurality of oil level detecting units each for detecting an oil level in a corresponding one of said plurality of compressors, and a two-way valve control means for closing said two-way valve when the oil level detected by at least one of said plurality of oil level detecting units becomes lower than a predetermined lower limit, and for subsequently opening said two-way valve when the oil levels detected by all said oil level detecting units become equal to or higher than a predetermined reference oil level.

* * * * *

UNITED STATES PATENT AND TRADEMARK OFFICE
CERTIFICATE OF CORRECTION

PATENT NO. : 5,996,363
DATED : December 7, 1999
INVENTOR(S) : Masao KURACHI et al.

It is certified that error appears in the above-identified patent and that said Letters Patent is hereby corrected as shown below:

On the title page in item [73] Assignee: change "Masushita Refrigeration Company," to --Matsushita Refrigeration Company,--.

Signed and Sealed this

Seventh Day of November, 2000

Attest:

Q. TODD DICKINSON

*Attesting Officer*   *Director of Patents and Trademarks*